United States Patent
Hama

(10) Patent No.: US 8,085,669 B2
(45) Date of Patent: Dec. 27, 2011

(54) SESSION RELAY DEVICE AND SESSION RELAY METHOD

(75) Inventor: Takayuki Hama, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

(21) Appl. No.: 12/092,037

(22) PCT Filed: Nov. 2, 2006

(86) PCT No.: PCT/JP2006/322007
§ 371 (c)(1),
(2), (4) Date: Apr. 29, 2008

(87) PCT Pub. No.: WO2007/052764
PCT Pub. Date: May 10, 2007

(65) Prior Publication Data
US 2009/0268742 A1 Oct. 29, 2009

(30) Foreign Application Priority Data
Nov. 7, 2005 (JP) ................................ 2005-322552

(51) Int. Cl.
*G01R 31/08* (2006.01)
*H04J 1/16* (2006.01)
*G06F 15/16* (2006.01)

(52) U.S. Cl. .................... 370/236; 370/232; 709/228

(58) Field of Classification Search ............... 370/232, 370/235, 236; 709/227, 228
See application file for complete search history.

(56) References Cited

U.S. PATENT DOCUMENTS

| | | | |
|---|---|---|---|
| 6,757,255 B1 * | 6/2004 | Aoki et al. .................... | 370/252 |
| 2003/0149715 A1 * | 8/2003 | Ruutu et al. .................. | 709/100 |
| 2003/0185208 A1 * | 10/2003 | Lee et al. ..................... | 370/389 |
| 2006/0098667 A1 * | 5/2006 | Shibata et al. ................ | 370/401 |

(Continued)

FOREIGN PATENT DOCUMENTS
JP 2000-022751 1/2000
(Continued)

OTHER PUBLICATIONS

Ajay Bakre et al., "I-TCP; Indirect TCP for Mobile Hosts", Department of Computer Science, Rutgers University, DSC-TR-314, 1994.
English-language abstract only of Japanese Patent Application Publication No. 11-252179 dated Sep. 17, 1999.
(Continued)

*Primary Examiner* — Ricky Ngo
*Assistant Examiner* — Paul Masur
(74) *Attorney, Agent, or Firm* — Scully, Scott, Murphy & presser, P.C.

(57) ABSTRACT

A session relay device which can reliably send a data packet from a source to a destination without the need for reconfiguring and dividing a segment is supplied. Session relay device 110, adapted to be disposed between terminals for transmitting and receiving data as packets to which sequence numbers representative of the order of segments to be transmitted are assigned, includes session relay section 110-3 that relays data transmitted as packets between a first session opened between session relay device 110 and a terminal on a transmission side and a second session opened between session relay device 110 and a terminal on a reception side. Session relay section 110-3 receives the retransmitted segment from a terminal on the transmission side, updates a maximum segment size of the second session with the segment size of the retransmitted segment, and transmits the retransmitted segment to a terminal on the reception side.

4 Claims, 25 Drawing Sheets

U.S. PATENT DOCUMENTS

2006/0248582 A1* 11/2006 Panjwani et al. ............... 726/13

FOREIGN PATENT DOCUMENTS

| JP | 2000-115278 | 4/2000 |
|---|---|---|
| JP | 2001-251353 | 9/2001 |
| JP | 2002-290459 | 10/2002 |
| JP | 2003-018216 | 1/2003 |
| JP | 3448481 | 7/2003 |
| JP | 2003-244194 | 8/2003 |
| JP | 3482091 | 10/2003 |
| JP | 3494610 | 11/2003 |
| JP | 2004-349958 | 12/2004 |
| JP | 2005-086292 | 3/2005 |

OTHER PUBLICATIONS

English-language abstract only of Japanese Patent Application Publication No. 10-200598 dated Jul. 31, 1998.
English-language abstract only of Japanese Patent Application Publication No. 2001-244957 dated Sep. 7, 2001.
Jon Pastel, "Transmission Control Protocol", IETF, RFC 793, 1981.
W. Richard Stevens, TCP/IP Illustrated, vol. 1, "The Protocols", Addison-Wesley, 1994, ISBN 0-201-63346-989.
Jon Postel, "Internet Control Message Protocol", IETF,RFC 792, 1981; and.
J. Mogul, S. Deering, "Path MTU Discovery", IETF, RFC 1191, 1990.

* cited by examiner

PRIOR ART

PRIOR ART

PRIOR ART

SESSION RELAY DEVICE AND SESSION RELAY METHOD

TECHNICAL FIELD

The present invention relates to a session relay device for relaying data between sessions.

BACKGROUND ART

Generally, a communication application establishes a communication session between transmitting and receiving terminals connected to each other through a network and performs communications on the established session. If a propagation delay time between the transmitting and receiving terminals is very long or they communicate with each other across networks having different properties such as wired and wireless networks, then the throughput of communications between the transmitting and receiving terminals is lowered.

One known method of solving the above problem has been not to perform communications between transmitting and receiving terminals on one session, but to install a relay device between transmitting and receiving terminals and relay data between two sessions, i.e., a session from the transmitting terminal to the relay device and a session from the relay device to the receiving terminal. Examples of such a session relay process include "Indirect TCP" described in Non-patent document 1 (Ajay Bakre and B. R. Badrinath "I-TCP; Indirect TCP for Mobile Host", Department of Computer Science Rutgers University, DSC-TR-314, 1994) and communication methods described in Patent document 1 (Japanese patent No. 3448481), Patent document 2 (Japanese patent No. 3482091), and Patent document 3 (Japanese patent No. 3494610).

An example of session communications according to TCP will be described below. Details of an ordinary TCP process are described in Non-patent document 2 (Jon Postel, "Transmission Control Protocol", IETF, RFC 793, 1981) and Non-patent document 3 (W. Richard Stevens, "TCP/IP Illustrated, Volume 1: The Protocols, Addison-Wesley", 1994, ISBN 0-201-63346-989).

FIG. 1 shows a double-sided-transmission session relay device for relaying sessions transmissively from both a transmitting terminal and a receiving terminal. As shown in FIG. 1, double-sided-transmission session relay device 32-0 comprises packet input section 32-1 to which packets from a network are input, packet output section 32-2 which outputs packets to the network, session relay section 32-3 for terminating and relaying sessions, session status storing section 32-4 for storing a session status of session relay section 32-3, session determining section 32-5 for determining whether a packet is a session packet or not, session relay determining section 32-6 for determining whether a session relay process is to be performed or not, and session starting process monitoring section 32-7 for monitoring a session starting packet.

Packet input section 32-1 performs a process of receiving packets from the network. Session determining section 32-5 determines whether an input packet from packet input section 32-1 is a session packet or not. If the input packet is a session packet, then session determining section 32-5 passes the input packet to session relay determining section 32-6. If the input packet is a packet other than a session packet, then session determining section 32-5 passes the input packet to packet output section 32-2.

Session relay determining section 32-6 determines whether the session packet from session determining section 32-5 is a packet in a session registered in session status storing section 32-4 and also a packet sent after a session start acknowledging packet, or not. If these conditions are satisfied, then session relay determining section 32-6 passes the session packet from session determining section 32-5 to session relay section 32-3. If the conditions are not satisfied, then session relay determining section 32-6 passes the session packet from session determining section 32-5 to session starting process monitoring section 32-7.

When session starting process monitoring section 32-7 receives a session starting packet, it registers session information representing a reception sequence number (a sequence number to be received from a receiving terminal) and a transmission sequence number (a sequence number to be transmitted to a transmitting terminal) which are temporarily generated, but not yet determined. When session starting process monitoring section 32-7 receives a session start acknowledging packet, it determines the reception sequence number and the transmission sequence number, which have been temporarily generated, in the session information. After the processing of session starting process monitoring section 32-7 is over, the session packet from session determining section 32-5 is passed to packet output section 32-2.

Session relay section 32-3 performs a session relay process based on the session status stored in session status storing section 32-4, stores an updated session status in session status storing section 32-4, and passes a packet from session relay determining section 32-6 to packet output section 32-2, Packet output section 32-2 outputs the supplied packet to the network.

A session according to a TCP in the session relay device shown in FIG. 1 will be described below. In the session according to the TCP, a session starting packet and a session start acknowledging packet are referred to as a SYN packet and a SYN• ACK packet, respectively.

FIG. 2 is a block diagram of a network configuration including session relay device 32-0 shown in FIG. 1. FIG. 3 is a sequence diagram of a TCP relay process performed by session relay device 32-0 in the network configuration shown in FIG. 2. The example shown in FIG. 3 represents a sequence operation for transferring data from transmitting terminal 10 having IP address A to port number 80 of receiving terminal 20 having IP address B.

First, transmitting terminal 10 sends a connection starting SYN packet to receiving terminal 20. The connection starting SYN packet includes information representing source IP address "A", source port number "x", sequence number "1", destination IP address "B", and destination port number "80".

In session relay device 32-0 on the route, the connection starting SYN packet from transmitting terminal 10 is supplied to packet input section 32-1. Packet input section 32-1 passes the supplied SYN packet to session determining section 32-5. Session determining section 32-5 determines that the packet from packet input section 32-1 is a session packet, and passes the packet to session relay determining section 32-6. Session relay determining section 32-6 determines that the packet received from session determining section 32-5 does not corresponds to a session registered in session status storing section 32-4, and passes the received packet to session starting process monitoring section 32-7.

Session starting process monitoring section 32-7 determines that the packet received from session relay determining section 32-6 is a session starting (SYN) packet, registers the session in session status storing section 1-4, and starts a session relay process to pass the received packet to packet output section 32-2. At this stage, at least a transmission sequence number to receiving terminal 20 and a reception sequence number from transmitting terminal 10 are stored in session status storing section 32-4. These two sequence numbers are initialized by the sequence number of the session starting (SYN) packet. The information of the session registered at this stage is incomplete session information as a whole because the transmission sequence number to receiving terminal 20 and the reception sequence number from transmitting terminal 10 have not yet been determined.

Having received the packet from session starting process monitoring section 32-7, packet output section 1-2 sends the received packet over the network to receiving terminal 20. The packet information in the SYN packet which is input to session relay device 32-0 and the packet information in the SYN packet which is output from session relay device 32-0 do not differ from each other.

When receiving terminal 20 receives the SYN packet from session relay device 32-0, it returns a SYN• ACK packet to transmitting terminal 10.

In session relay device 32-0 on the route, the SYN• ACK packet from receiving terminal 20 is supplied to packet input section 32-1. Packet input section 32-1 passes the SYN•ACK packet to session determining section 32-5. Session determining section 32-5 determines that the packet received from packet input section 32-1 is a session packet, and passes the received packet to session relay determining section 32-6. Session relay determining section 32-6 determines that the packet received from session determining section 32-5 corresponds to a session registered in session status storing section 1-4, and is not a packet after the session start acknowledging (SYN•ACK) packet, and passes the received packet to session starting process monitoring section 32-7.

Session starting process monitoring section 32-7 determines that the packet received from session relay determining section 32-6 is not a session starting (SYN) packet, but is a session start acknowledging (SYN•ACK) packet, updates the session information in session status storing section 32-4, and starts a session relay process to pass the received packet to packet output section 1-2. At this stage, the transmission sequence number to receiving terminal 20 and the reception sequence number from transmitting terminal 10 are updated. These two sequence numbers are initialized by the sequence number of the session start acknowledging (SYN• ACK) packet.

Having received the packet from session starting process monitoring section 32-7, packet output section 32-2 sends the received packet over the network to transmitting terminal 10. The packet information in the SYN• ACK packet which is input to session relay device 32-0 and the packet information in the SYN packet which is output from session relay device 32-0 do not differ from each other.

Thereafter, in session relay device 32-0, session relay section 32-3 returns an ACK packet responsive to the SYN•ACK packet to receiving terminal 20. In this manner, session relay device 32-0 opens a session between transmitting terminal 10 and receiving terminal 20.

When the communication route suffers a certain failure after the session has been opened, a status notification is performed according to ICMP (Internet control massage Protocol). Details of operation according to ICMP are described in Non-patent document 3 and Non-patent document 4 (Jon Postel, "INTERNET CONTROL MESSAGE PROTOCOL", IETF, RFC 792, 1981).

If an IP header contains a "Don't Fragment" flag when the route includes zones of different MTUs (Maximum Transfer Units), then the data cannot be fragmented and transferred. One solution to this problem is a process called Path MTU discovery proposed in Non-patent document 5 (J. Mogul, S. Deering, "Path MTU discovery", IETF, RFC 1191, 1990).

FIG. 4 shows a packet configuration of an ICMP Destination Unreachable/fragmentation request message. FIG. 5 shows a configuration of a PET part which has caused an error that is included in the ICMP Destination Unreachable/fragmentation request message. According to the Path MTU discovery process, if data cannot be fragmented and transferred because of the "Don't Fragment" flag in a router which includes zones of different MTUs, then the next-hop MTU is added to the ICMP Destination Unreachable/fragmentation request message shown in FIG. 4 and the message is sent to the source, so that the terminal of the source will retransfer a segment with a reduced MSS (Maximum Segment Size). In FIG. 4, "Internet Header+64 bits of Original Data Datagram" includes the information shown in FIG. 5 which is included in the packet which has caused the error.

When the communication route contains a plurality of zones of different MTUs, a process of notifying the source of an MTU according to the ICMP to reduce the MSS is repeated until a minimum MTU is detected. At the time the minimum MTU is detected, communications are made possible between the source and the destination. A similar process is disclosed in Patent document 4 (JP-A No. 2003-18216).

FIG. 6 is a diagram illustrative of an operation based on Path MTU discovery of a network apparatus having the double-sided-transmission session relay device shown in FIGS. 1 and 2. The operation based on Path MTU discovery with respect to an example according to TCP will be described below with reference to FIG. 6. In this example, the sum of IP and TCP header sizes is 40 bytes.

After the SYN process, transmitting terminal 421 (address: A, port: x) sends data having a segment size of 1460 bytes and a packet size of 1500 bytes toward receiving terminal 423 (address: B, part: 80). The data output from transmitting terminal 421 is supplied to router 422 (address: C). Since the next hop is in the zone of "MTU=500", router 422 which has received the data from transmitting terminal 421 adds the next-hop MTU to the ICMP Destination Unreachable/fragmentation request message, and sends the message to transmitting terminal 421. The ICMP Destination Unreachable/fragmentation request message from router 422 is supplied to transmitting terminal 421.

In response to the fragmentation request message, transmitting terminal 421 resends data having a segment size of 460 bytes and a packet size of 500 bytes toward receiving terminal 423. As the packet size of the data resent from transmitting terminal 421 is 500 bytes, router 422 sends the data resent from transmitting terminal 421 to receiving terminal 423. As a result, the packet of the resent data reaches receiving terminal 423, allowing data to be exchanged continuously between transmitting terminal 421 and receiving terminal 423.

DISCLOSURE OF THE INVENTION

However, while the operation based on Path MTU discovery is being carried out, the double-sided-transmission session relay device of the related art suffers the following problems:

FIG. 7 is a diagram illustrative of the Path MTU discovery problems which the double-sided-transmission session relay device of the related art suffers according to the TCP. In the example shown in FIG. 7, session relay device 432 is connected between transmitting terminal 431 and receiving terminal 434, and router 433 is connected between receiving terminal 434 and session relay device 432. The route from transmitting terminal 431 to router 433 has an MTU of 1500, and the route from router 433 to receiving terminal 434 has an MTU of 500. The sum of IP and TCP header sizes is 40 bytes.

Transmitting terminal 431 sends data having a sequence number 1-1460 and a packet size of 1500 bytes toward receiving terminal 434. Session relay device 432 on the route terminates an ACK packet and returns it to transmitting terminal 431. Thereafter, session relay device 432 sends the data with the sequence number 1-1460 and to receiving terminal 434.

The sequence number 1-1460 sent from session relay device 432 is supplied to router 433 which is disposed immediately prior to the zone of MTU=500. Since router 433 is unable to send data having a packet size of 1500 bytes, router 433 sends an ICMP Destination Unreachable/fragmentation request message (MTU=500) toward transmitting terminal 431.

As session relay device 432 allows ICMP packets to pass therethrough, the ICMP Destination Unreachable/fragmentation request message (MTU=500) from router 433 reaches transmitting terminal 431 without being altered. According to the ICMP Destination Unreachable/fragmentation request message (MTU=500), transmitting terminal 431 sends data having a sequence number 1-1501-1960 and a reduced packet size of 500 bytes toward receiving terminal 434.

Since session relay device 432 has not yet received an acknowledging packet from the receiving side, it keeps resending a packet having a packet size of 1500 bytes and a sequence number 1-1460. Therefore, the data of the sequence number 1-1501-1960 from transmitting terminal 431 are not sent, but stored in session relay device 432. The data of the sequence number 1-1501-1960 are thus not sent beyond router 433. Each time router 433 receives a packet having a sequence number 1-1460 resent from session relay device 432, router 433 sends again an ICMP Destination Unreachable/fragmentation request message (MTU=500) toward transmitting terminal 431.

As described above, session relay device 432 keeps resending a packet having a sequence number 1-1460 without changing its packet size of 1500 bytes until it receives an acknowledging packet from the receiving side. Therefore, even if session relay device 432 receives data having a sequence number 1-1501-1960 with a reduced maximum segment size, it does not send the received data to router 433. As a result, session relay device 432 accumulates data from transmitting terminal 431 until finally the communications will completely be stopped.

It is possible for transmitting terminal 431 to have a function to check for a mismatch the sequence number of the session information that is present in the header information which has caused an error that is contained in the ICMP Destination Unreachable/fragmentation request message. However, since the indicated sequence number is a sequence number that has been acknowledged for transmission, transmitting terminal 431 does not reduce the packet size for transmission even when it receives an ICMP Destination Unreachable/fragmentation request message.

Patent document 3 reveals a process of terminating an error packet according to ICMP with a double-sided-transmission TCP relay device. However, since the TCP relay device needs to reconfigure and divide the segment, the process is problematic in that the processing cost is high.

It is an exemplary object of the present invention to provide a session relay device which will solve the above problems of the operation based on Path MTU discovery, can reliably send a data packet resent from a source to a destination without the need for reconfiguring and dividing a segment, and has a low processing cost.

To achieve the above object, there is provided in accordance with the present invention a session relay device adapted to be disposed between terminals for transmitting and receiving data as packets to which sequence numbers representative of the order of segments to be transmitted are assigned, for relaying data transmitted as packets between a first session opened between the session relay device and a terminal on a transmission side and a second session opened between the session relay device and a terminal on a reception side, the session relay device comprising a session status holder for holding information of the first and second sessions, a segment retransmission determining section for, when a packet is received through the first session, determining whether the segment of the received packet is a retransmitted segment having a sequence number identical to, and a segment size different from, the segment of a packet already received through the first segment, by referring to session information held by the session status holder, and a segment retransmitter for, if it is determined by the segment retransmission determining section that the segment of the received packet is the retransmitted segment, transmitting the retransmitted segment through the second session. A maximum segment size of the second session may be updated with a segment size of the retransmitted segment received from the terminal on the transmission side, or may be updated based on a maximum transfer unit in a fragmentation request message received through the second session.

Since the retransmitted segment from the source is delivered toward the destination, the session relay device according to the present invention is free of the problems of the related art that retransmitted segments are accumulated in the session relay device, tending to stop communications.

As the retransmitted sequent has been divided in the source, there is no need to reconfigure and divide the segment.

According to the present invention, since the retransmitted segment from the transmitting terminal is necessarily transmitted toward a relay device which has delivered a fragmentation request message, the session relay device can maintain stable communications between the transmitting terminal and the receiving terminal without causing communications failures.

Even if Path MTU discovery occurs, the transmitting terminal divides the segment into packets according to Path MTU without a mismatch according to the fragmentation request message and delivers the divided packets, and the session relay device does not need to make such a segment division. Accordingly, the session relay device can relay the session at a minimum processing cost.

Figure 1:
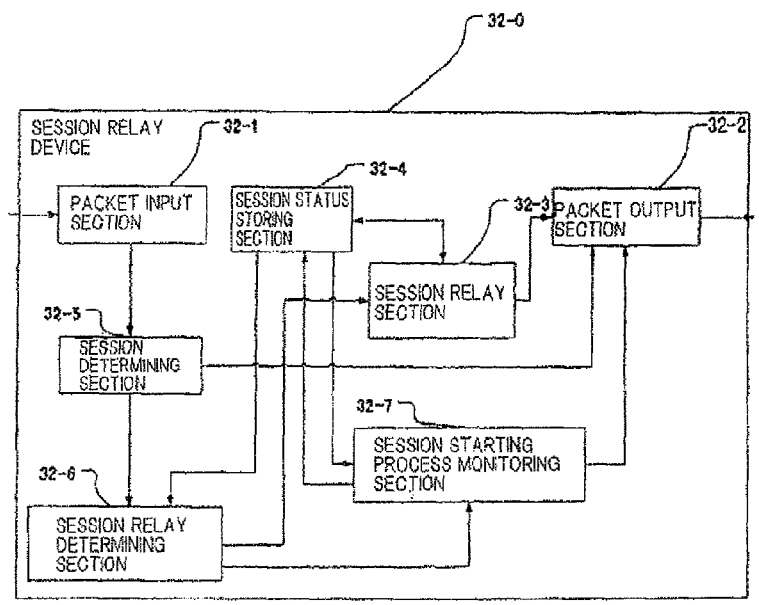
FIG. 1 is a block diagram showing a configuration of a double-sided-transmission session relay device of the related art.
Figure 2:
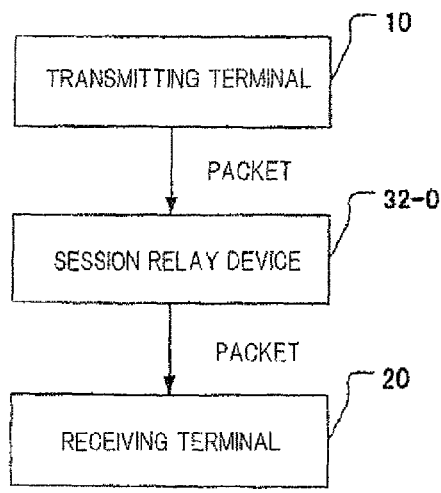
FIG. 2 is a block diagram showing a network configuration including the session relay device shown in FIG. 1.
Figure 3:
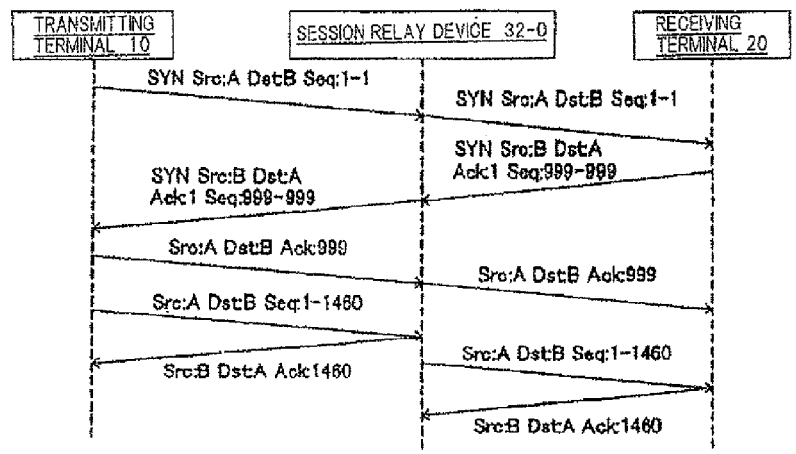
FIG. 3 is a diagram illustrative of a sequence operation for TCP relaying of the session relay device in the network configuration shown in FIG. 2.

DESCRIPTION OF REFERENCE NUMERALS 110 session relay device
110-1 packet input section
110-3 session relay section
110-4 packet output section
110-5 packet input section
110-6 session packet determining section
110-7 transmission acknowledgement receiver
110-8 session status holder
110-9 transmission acknowledgement packet transfer/termination determining section
110-10 transmission acknowledgement transmitter
110-11 packet output section
110-12 error report protocol terminator
110-13 fragmentation request message transfer section

BEST MODE FOR CARRYING OUT THE INVENTION

The best mode for carrying out the invention will be described in detail below with reference to the drawings.

The present invention is concerned with a session relay device adapted to be disposed between terminals for transmitting and receiving data as packets to which sequence numbers representative of the order of segments to be transmitted are assigned, for relaying data transmitted as packets between a first session opened between the session relay device and a terminal on a transmission side and a second session opened between the session relay device and a terminal on a reception side, the session relay device comprising a session status holder for holding information of the first and second sessions, wherein when a packet is received through the first session, the session relay device determines whether the segment of the received packet is a retransmitted segment having a sequence number identical to, and a segment size different from, the segment of a packet already received through the first segment by referring to session information held by the session status holder, and if it is determined that the segment of the received packet is the retransmitted segment, the session relay device changes a maximum segment size of the second session, and transmits the retransmitted segment through the second session.

The terminal on the transmission side may be a transmitting terminal, a router, or the session relay device. The terminal on the reception side may be a receiving terminal, a router, or the session relay device. The session status holder is capable of holding information of sessions respectively in a plurality of networks interconnecting the transmitting terminal and the receiving terminal. The maximum segment size of the second session may be updated by the segment size of the retransmitted segment, or may be updated based on the "maximum transfer unit of a next hop" in a fragmentation request message.

Specific configurational details of the present invention will be described below with respect to a first exemplary embodiment in which the maximum segment size of a session is updated by the segment size of a retransmitted segment, and second and third exemplary embodiments in which the maximum segment size of a session is updated based on the "maximum transfer unit of a next hop" in a fragmentation request message.

1st Exemplary Embodiment

Figure 8:
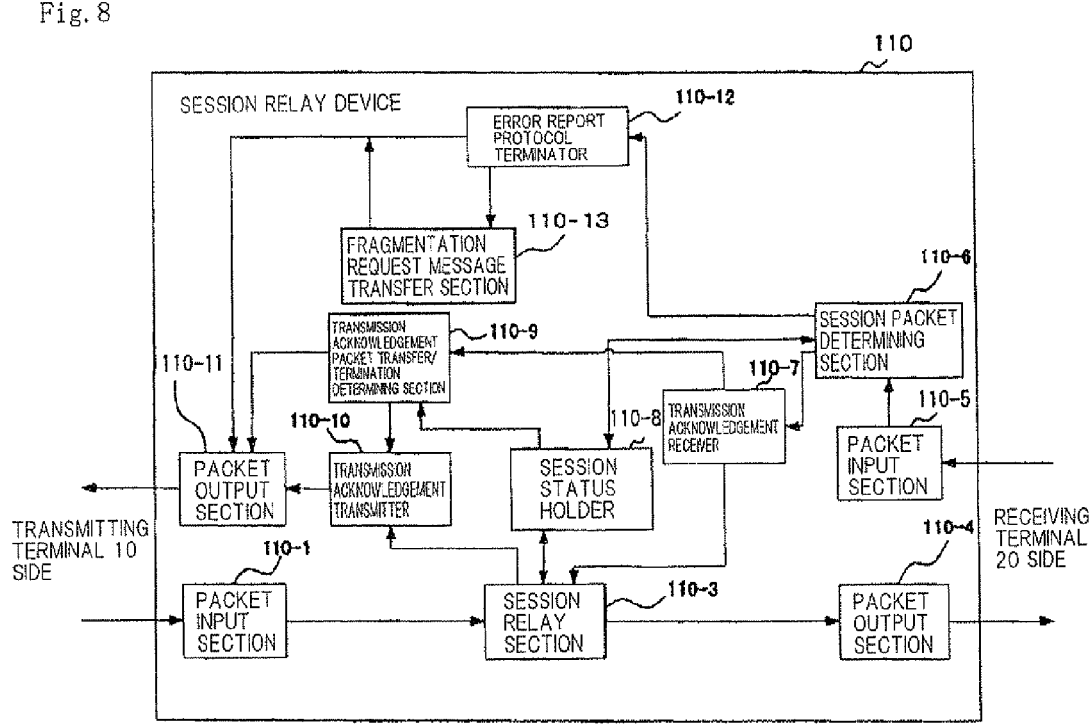
FIG. 8 is a block diagram showing a configuration of a session relay device according to a first exemplary embodiment of the present invention.
Figure 9:
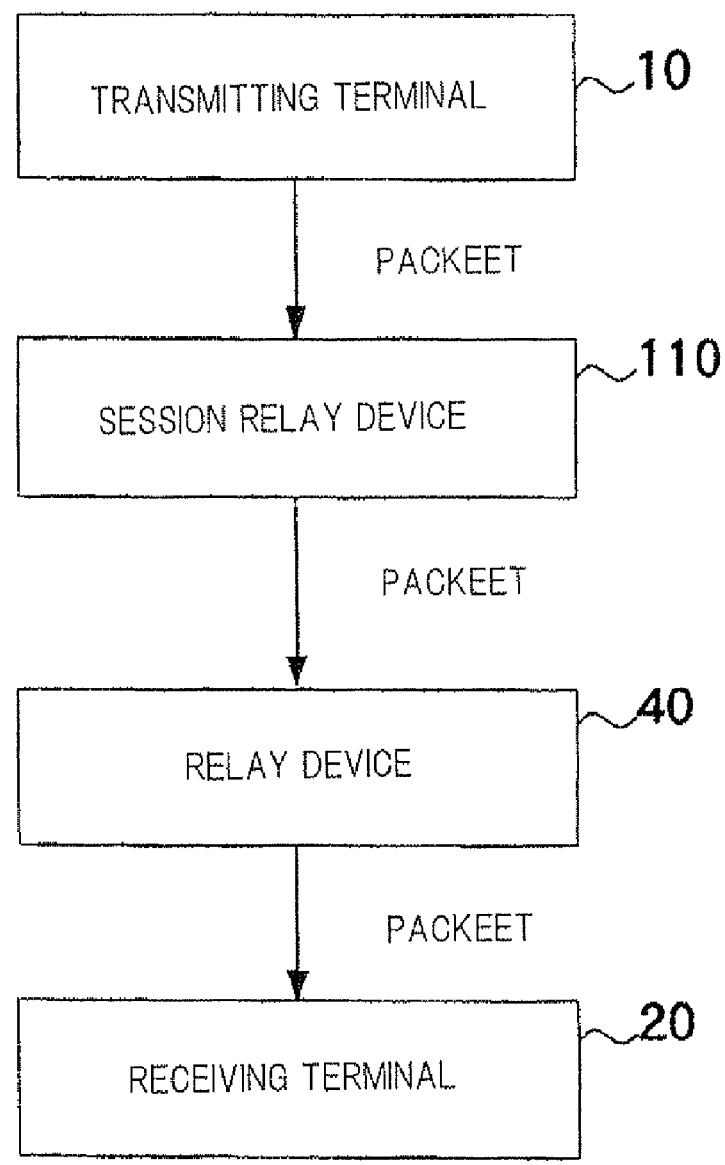
FIG. 9 is a block diagram showing a network configuration including the session relay device shown in FIG. 8.

FIG. 8 is a block diagram showing a configuration of a session relay device according to a first exemplary embodiment of the present invention. FIG. 9 is a block diagram showing a network configuration including the session relay device shown in FIG. 8.

In the network configuration shown in FIG. 9, relay device 40 is disposed between transmitting terminal 10 and receiving terminal 20, and session relay device 110 is disposed between transmitting terminal 10 and relay device 40. Relay device 40 comprises a router, for example. A specific process for session relay device 110 to relay data that are transmitted from transmitting terminal 10 to receiving terminal 20 will be described below. For the sake of brevity, processing and configurational details required to open sessions will be omitted from illustration, and it is assumed that session data flow in one direction. The session opening process is performed in the manner described above with respect to the operation of the session relay device shown in FIG. 1.

As shown in FIG. 8, session relay device 110 mainly comprises packet input section 110-1, session relay section 110-3, packet output section 110-4, packet input section 110-5, session packet determining section 110-6, transmission acknowledgement receiver 110-7, session status holder 110-8, transmission acknowledgement packet transfer/termination determining section 110-9, transmission acknowledgement transmitter 110-10, packet output section 110-11, error report protocol terminator 110-12, and fragmentation request message transfer section 110-13.

Packet input section 110-1 is supplied with a packet input from transmitting terminal 10. Session relay section 110-3 performs a session relay process for relaying the packet input to packet input section 110-1. Packet output section 110-4 outputs the packet from session relay section 110-3 toward receiving terminal 20.

Packet input section 110-5 is supplied with a packet input from receiving terminal 20. Session packet determining section 110-6 determines whether the packet input to packet input section 110-5 is a session packet or not. If the packet is determined as a session packet, it is supplied from session packet determining section 110-6 to transmission acknowledgement receiver 110-7. If the packet is determined as no session packet, it is supplied from session packet determining section 110-6 to error report protocol terminator 110-12.

Transmission acknowledgement receiver 110-7 receives, through packet input section 110-5 and session packet determining section 110-6, a transmission acknowledgement packet which is delivered as a session response packet from receiving terminal 20. Session status holder 110-8 holds the status of a session relayed by session relay section 110-3.

Transmission acknowledgement packet transfer/termination determining section 110-9 determines whether it is to transfer the transmission acknowledgement packet received by transmission acknowledgement receiver 110-7 or to terminate the transmission acknowledgement packet and perform a normal session relay process. Transmission acknowledgement transmitter 110-10 sends the transmission acknowledgement packet to transmitting terminal 10. Packet output section outputs the supplied packet to transmitting terminal 10. Error report protocol terminator 110-12 terminals an error report protocol. Fragmentation request message transfer section 110-13 removes a fragmentation request message of the error report protocol from error report protocol terminator 110-12, and delivers the fragmentation request message to transmitting terminal 10.

In session relay device 110 shown in FIG. 8, a packet delivered from transmitting terminal 10 is supplied through packet input section 110-1 to session relay section 110-3. When the packet is input from packet input section 110-1 to session relay section 110-3, session relay section 110-3 performs a session relay process on the input packet.

Figure 10:
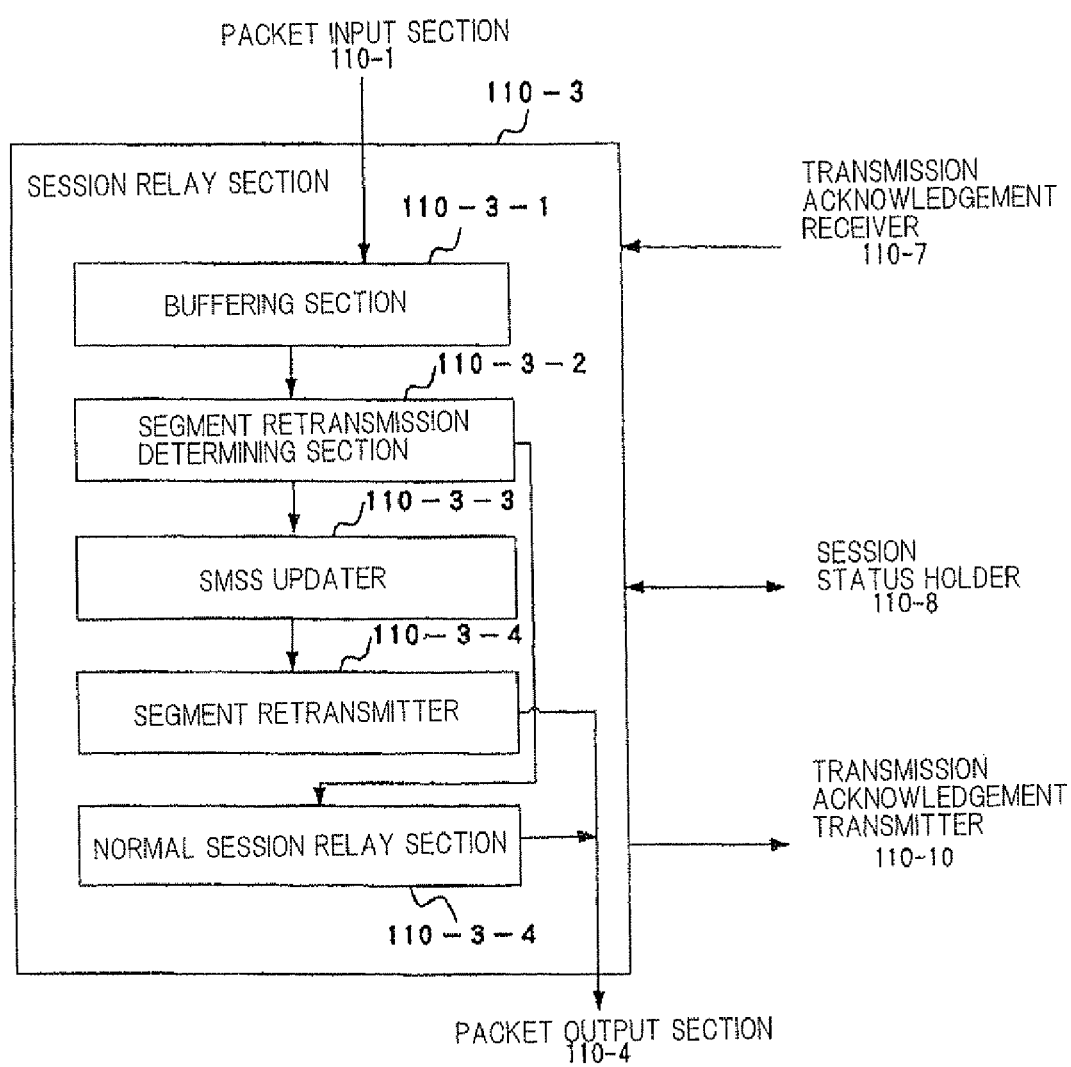
FIG. 10 is a block diagram showing a configuration of a session relay processor of a session relay section shown in FIG. 8.

FIG. 10 shows a configuration of a session relay processor of session relay section 110-3. As shown in FIG. 10, the session relay processor comprises buffering section 110-3-1 for buffering a packet from packet input section 110-1, segment retransmission determining section 110-3-2 for determining whether the buffered segment is a retransmitted segment with a changed segment size or not, SMSS updater 110-3-3 for updating the maximum segment size of a session (hereinafter referred to as SMSS) if the buffered segment is a retransmitted segment with a changed segment size, segment retransmitter 110-3-4 for retransmitting the retransmitted segment with the changed segment size, and normal session relay section 110-3-5 for performing a normal session relay process on the segment which is not a retransmitted segment with a changed segment size.

In session relay section 110-3, segment retransmission determining section 110-3-2 determines whether a segment from transmitting terminal 10 is a retransmitted segment with a changed segment size or not. If the segment is a retransmitted segment with a changed segment size, then segment retransmitter 110-3-4 retransmits the retransmitted segment toward receiving terminal 20 unconditionally or at an arbitrary timing including a retransmission. The term "a retransmitted segment with a changed segment size" refers to a retransmitted segment having the same starting sequence number and a different segment size. The term "an arbitrary timing including a retransmission" refers to a timing which is defined as a fixed time or a random time. To the determining condition of segment retransmission determining section 110-3-2, there may be added a condition that a retransmitted segment has not yet reached receiving terminal 20, or a condition that a retransmitted segment size is the SMSS or smaller, or a condition that both the above conditions are satisfied.

In session relay section 110-3, if a buffered segment is a retransmitted segment with a changed segment size, then SMSS updater 110-3-3 updates the SMSS into the retransmitted segment size. To the condition for updating the SMSS, there may be added a condition that the maximum segment size acknowledged for transmission is less than a maximum segment size which has been registered in session status holder 110-8 that was negotiated when the session was opened. The time stamp of the delivered packet and its segment size may be held in session status holder 110-8.

The initial value of the SMSS is selected to be a segment size that is indicated to receiving terminal 20 when the session is opened. The maximum segment size acknowledged for transmission is specifically given as the maximum value of increases in the transmission acknowledgement sequence numbers in transmission acknowledgement packets. For example, if the transmission acknowledgement sequence number in a first transmission acknowledgement packet is 0, the transmission acknowledgement sequence number in a second transmission acknowledgement packet is 500, the transmission acknowledgement sequence number in a third transmission acknowledgement packet is 1500, and the transmission acknowledgement sequence number in a fourth transmission acknowledgement packet is 2250 when the first though fourth transmission acknowledgment packets are received, then the increases in the transmission acknowledgement sequence numbers in the second, third, and fourth transmission acknowledgement packets are 500, 1000, and 750, respectively. In this case, the maximum segment size acknowledged for transmission is 1000.

In session relay device 110 shown in FIG. 8, a packet delivered from receiving terminal 20 or relay device 40 is supplied through packet input section 110-5 to session packet determining section 110-6. When the packet is input from packet input section 110-5 to session packet determining section 110-6, session packet determining section 110-6 determines whether the input packet is a session packet registered in session status holder 110-8 or not. If the input packet is a session packet, then session packet determining section 110-6 transfers the input packet (transmission acknowledgement packet) to transmission acknowledgement receiver 110-7. If the input packet is not a session packet, then session packet determining section 110-6 transfers the input packet (error report protocol) to error report protocol terminator 110-12.

When the session packet (transmission acknowledgement packet) is supplied from session packet determining section 110-6 to transmission acknowledgement receiver 110-7, transmission acknowledgement packet transfer/termination determining section 110-9 determines whether it is to transfer the transmission acknowledgement packet to packet output section 110-11 or to terminate the transmission acknowledgement packet and perform a normal session relay process.

Figure 11:
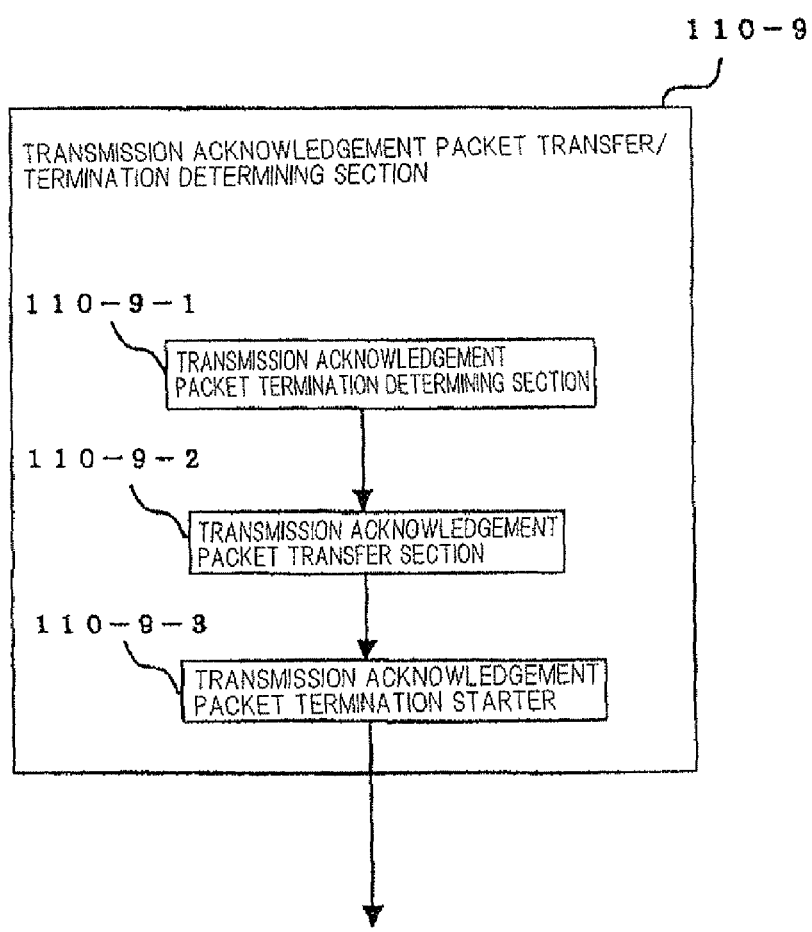
FIG. 11 is a block diagram showing a configuration of a transmission acknowledgement packet transfer/termination determining section shown in FIG. 8.

FIG. 11 shows a central portion of transmission acknowledgement packet transfer/termination determining section 110-9. As shown in FIG. 11, transmission acknowledgement packet transfer/termination determining section 110-9 comprises transmission acknowledgement packet termination determining section 110-9-1 for determining the start of the termination of the transmission acknowledgement packet based on the SMSS, transmission acknowledgement packet transfer section 110-9-2 for transferring the transmission acknowledgement packet, and transmission acknowledgement packet termination starter 110-9-3 for starting the normal session relay process and stopping the transfer of the transmission acknowledgement packet.

Transmission acknowledgement packet termination determining section 110-9-1 finds the difference (corresponding to the maximum segment size acknowledged for transmission) between an unacknowledged transmission sequence number (corresponding to the sequence number of a start packet of a session opened between the session relay device and the transmitting terminal) and the transmission acknowledgement sequence number of the transmission acknowledgement packet from receiving terminal 20, and determines whether the sequence number difference reaches n times the SMSS (a set value given as a multiple of the SMSS). In TCP which is representative of a session protocol, depending on the settings, one transmission acknowledgement packet is sent per received packet or two transmission acknowledgement packets are sent per two received packets (so-called delayed response). According to some installed designs, one transmission acknowledgement packet is sent per n received packets (n is a natural number). Therefore, n of the "n times the SMSS" differs depending on the delayed response.

Immediately after the session has been opened and until the sequence number difference reaches n times the SMSS, transmission acknowledgement packet transfer section 110-9-2 transfers the transmission acknowledgement packet from transmission acknowledgement receiver 110-7 to packet output section 110-11, and transmission acknowledgement transmitter 110-10 does not deliver the transmission acknowledgement packet. After the sequence number difference has reached n times the SMSS, transmission acknowledgement packet transfer section 110-9-2 does not transfer the transmission acknowledgement packet, and transmission acknowledgement packet termination starter 110-9-3 terminates the transmission acknowledgement packet from transmission acknowledgement receiver 110-71 causing transmission acknowledgement transmitter 110-10 to start transmitting the transmission acknowledgement packet. If the SMSS is stored in session status holder 110-8 in association with a time stamp, then the value of the SMSS associated with the time stamp may be acquired from session status holder 110-8 based on the time stamp in the transmission acknowledgement packet from receiving terminal 20, and the acquired value of the SMSS may be used instead of the sequence number difference.

When the packet (error report protocol) is supplied from session packet determining section 110-6 to error report protocol terminator 110-12, error report protocol terminator 110-12 terminates the error report protocol. Then, fragmentation request message transfer section 110-13 removes a fragmentation request message of the error report protocol from error report protocol terminator 110-12 and delivers the fragmentation request message to transmitting terminal 10.

Figure 12:
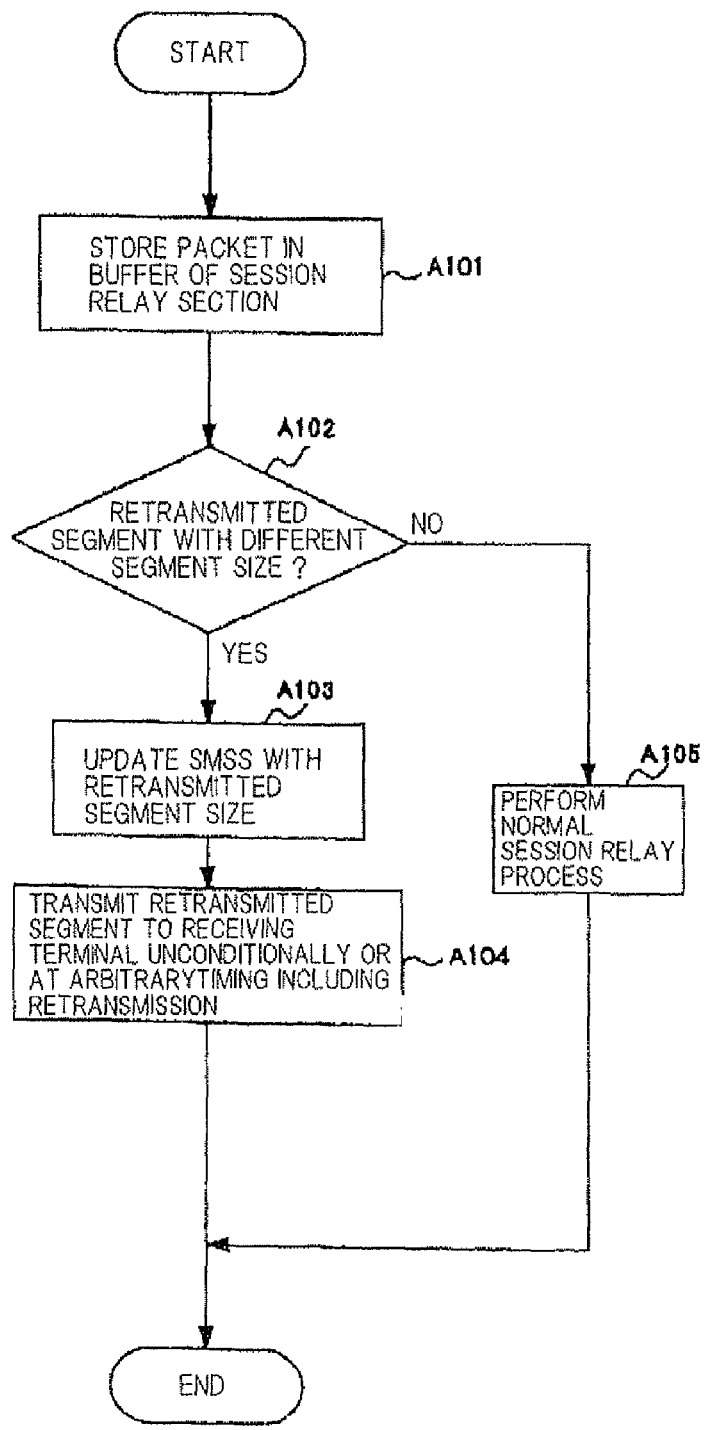
FIG. 12 is a flowchart illustrative of an operation of the session relay section shown in FIG. 8.
Figure 13:
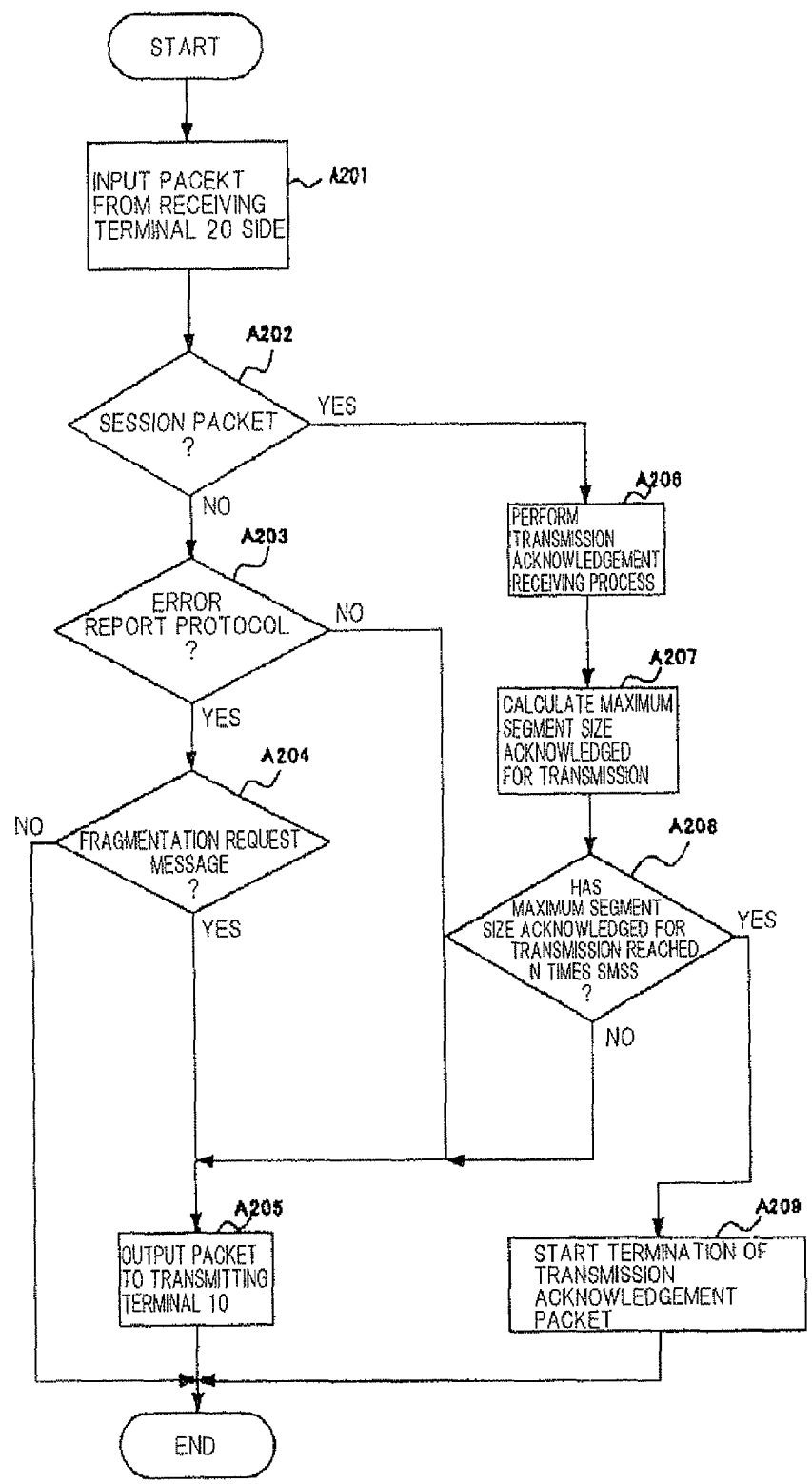
FIG. 13 is a flowchart illustrative of an operation of the transmission acknowledgement packet transfer/termination determining section shown in FIG. 8.

Specific operational details of the session relay device according to the present exemplary embodiment will be described below. FIG. 12 shows an operation of the session relay device according to the present exemplary embodiment with respect to the direction of communications from transmitting terminal 10 to receiving terminal 20. FIG. 13 shows an operation of the session relay device according to the present exemplary embodiment with respect to the direction of communications from receiving terminal 20 to transmitting terminal 10.

First, an operation of session relay device 110 upon arrival of a data packet from transmitting terminal 10 immediately after the session opening process is finished will be described below with reference to FIG. 12.

Immediately after the session has been opened, transmission acknowledgement packet transfer section 110-9-2 transfers the transmission acknowledgement packet from transmission acknowledgement receiver 110-7 to packet output section 110-11, and transmission acknowledgement transmitter 110-10 does not deliver the transmission acknowledgement packet.

The data packet input from packet input section 110-1 is supplied to session relay section 110-3. In session relay section 110-3, buffering section 110-3-1 buffers and holds the supplied packet (step A101). Then, segment retransmission determining section 110-3-2 determines whether the segment held by buffering section 110-3-1 is a retransmitted segment with a different segment size or not. At this stage, since the segment held by buffering section 110-3-1 is not a retransmitted segment with a different segment size, step A102 judges "NO".

When step A102 judges "NO", normal session relay section 110-3-5 performs a normal session relay process (A105). In the normal session relay process, the segment held by buffering section 110-3-1 is output from packet output section 110-4 toward receiving terminal 20.

The segment delivered from session relay device 110 toward receiving terminal 20 is received by relay device 40. If the size of the received segment is greater than the MTU, then the relay device 40 delivers a fragmentation request message of an error report protocol toward transmitting terminal 10. The fragmentation request message of the error report protocol is received by session relay device 110.

An operation of session relay device 110 upon arrival of the fragmentation request message of the error report protocol from relay device 40 will be described below with reference to FIG. 13.

The packet from the side of receiving terminal 20 is input to packet input section 110-5 (step A201). The packet input to packet input section 110-5 is supplied to session packet determining section 110-6, which determines whether the input packet is a session packet or not (step A202). Since the packet from the side of receiving terminal 20 is the fragmentation request message of the error report protocol delivered from relay device 40 toward transmitting terminal 10, step A202 judges "NO".

When step A202 judges "NO", session packet determining section 110-6 transfers the input packet from packet input section 110-5 to error report protocol terminator 110-12, which determines whether the input packet is an error report protocol or not (step A203). Since the input packet is the fragmentation request message of the error report protocol delivered from relay device 40 toward transmitting terminal 10, step A203 judges "YES".

When step A203 judges "YES", error report protocol terminator 110-12 transfers the input packet from packet input section 110-5 to fragmentation request message transfer section 110-13, which determines whether the supplied packet is a fragmentation request message or not (step A204). Since the packet supplied to error report protocol terminator 110-12 is the fragmentation request message, step A204 judges "YES".

When step A204 judges "YES", fragmentation request message transfer section 110-13 removes the fragmentation request message of the error report protocol from error report protocol terminator 110-12, and delivers it to transmitting terminal 10 (step A205).

Having received the fragmentation request message from session relay device 110, transmitting terminal 10 retransmits a packet with a reduced segment size toward receiving terminal 20 according to the received fragmentation request message.

An operation of session relay device 110 upon arrival of the packet with the reduced segment size from transmitting device 10 will be described below with reference to FIG. 12.

The packet from transmitting terminal 10 is supplied from packet input section 110-1 to session relay section 110-3. In session relay section 110-3, buffering section 110-3-1 buffers and holds the supplied packet (step A101). Then, segment retransmission determining section 110-3-2 determines whether the segment held by buffering section 110-3-1 is a retransmitted segment with a different segment size or not. At this stage, since the segment held by buffering section 110-3-1 is a retransmitted segment with a different segment size, step A102 judges "YES".

When step A102 judges "YES", SMSS updater 110-3-3 updates SMSS with the retransmitted segment size (step A103). Segment retransmitter 110-3-4 retransmits the retransmitted segment through packet output section 110-4 toward the receiving terminal unconditionally or at an arbitrary timing including a retransmission (step A104).

Inasmuch as the size of the retransmitted segment transmitted by segment retransmitter 110-3-4 is the size according to the fragmentation request message that relay device 40 has returned to the source, the retransmitted segment passes through relay device 40 and reaches receiving terminal 20. Upon reception of the retransmitted segment, receiving terminal 20 transmits a transmission acknowledgement packet toward transmitting terminal 10. The transmission acknowledgement packet is transmitted through relay device 40 and received by session relay device 110.

An operation of session relay device 110 upon reception of the transmission acknowledgement packet from receiving terminal 20 will be described below with reference to FIG. 13.

The packet from the side of receiving terminal 20 is input to packet input section 110-5 (step A201). The packet input to packet input section 110-5 is supplied to session packet determining section 110-6, which determines whether the input packet is a session packet or not (step A202). Since the packet from the side of receiving terminal 20 is the transmission acknowledgement packet, step A202 judges "YES".

When step A202 judges "YES", transmission acknowledgement receiver 110-7 performs a transmission acknowledgement receiving process (step A206). Then, transmission acknowledgement packet termination determining section 110-9-1 calculates a maximum segment size acknowledged for transmission (step A207), and determines whether the maximum segment size acknowledged for transmission is n times the SMSS (n is a natural number) or not (step A208). Since there is no delayed response in this flow, one transmission acknowledgement packet is returned per received packet from the reception side according to the settings. In step A208, therefore, transmission acknowledgement packet termination determining section 110-9-1 determines the maximum segment size acknowledged for transmission is one time the SMSS or not. Since the maximum segment size acknowledged for transmission is one time the SMSS, step A208 judges "YES".

When step A208 judges "YES", transmission acknowledgement packet transfer section 110-9-2 instructs transmission acknowledgement transmitter 110-10 to start a transmission acknowledgement process for delivering a transmission acknowledgement packet for the received packet (step A209). Thereafter, the transmission acknowledgement packet from the reception side is terminated and will not be transferred to transmitting terminal 10. The transmission acknowledgement packet from the reception side is thus terminated by session relay device 110, and transmission acknowledgement transmitter 110-10 starts transmitting a transmission acknowledgement packet toward transmitting terminal 10.

With the session relay device according to the present exemplary embodiment described above, a retransmitted segment from transmitting terminal 10 is necessarily transmitted to relay device 40. Accordingly, the session relay device can maintain stable communications between transmitting terminal 10 and receiving terminal 20 without causing communications failures.

With the session relay device according to the present exemplary embodiment, furthermore, since a transmission acknowledgement packet from the reception side is transferred directly to the transmitting terminal immediately after the session has been opened, the session relay device can avoid a deadlock due to an overflow of packets from the transmitting terminal.

2nd Exemplary Embodiment

Figure 14:
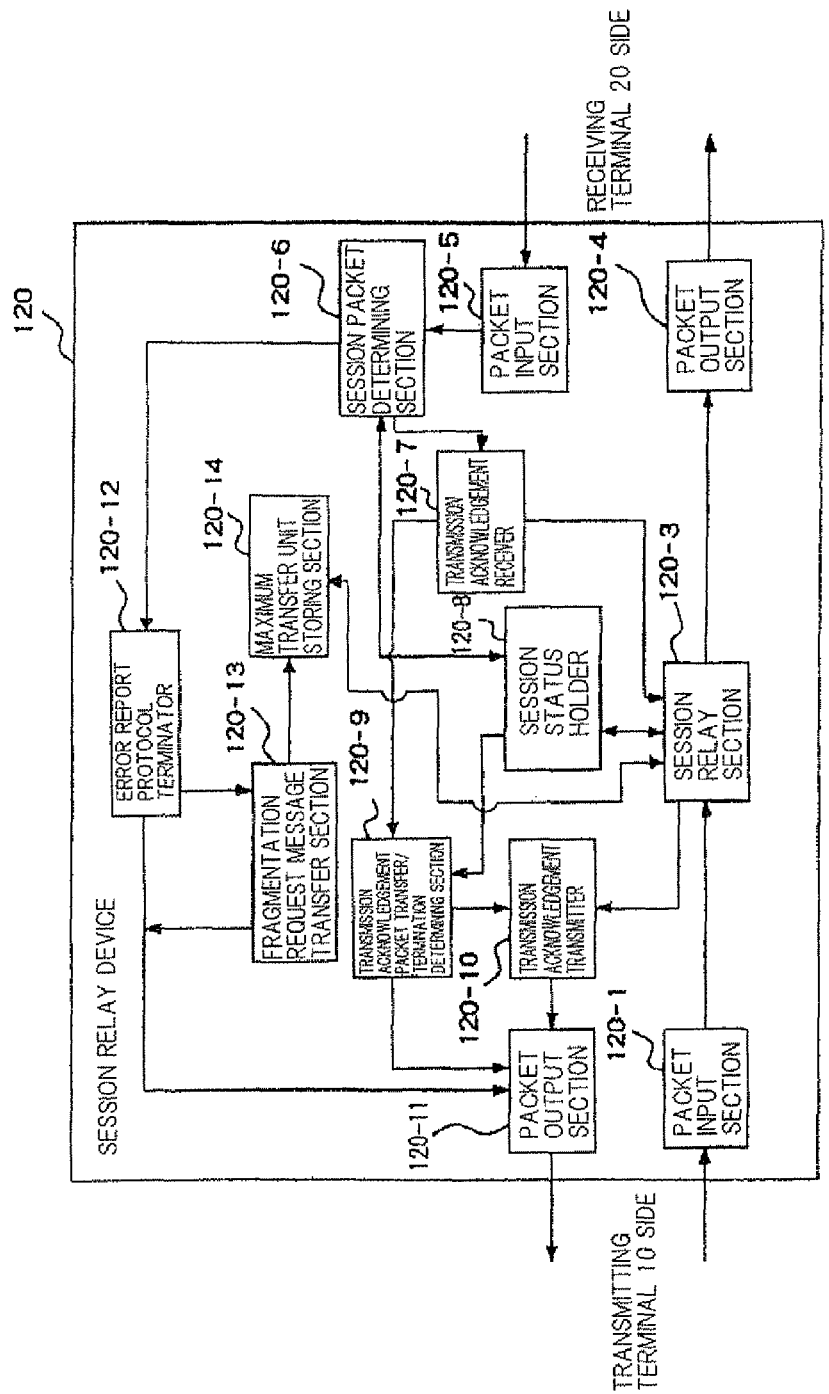
FIG. 14 is a block diagram showing a configuration of a session relay device according to a second exemplary embodiment of the present invention.
Figure 15:
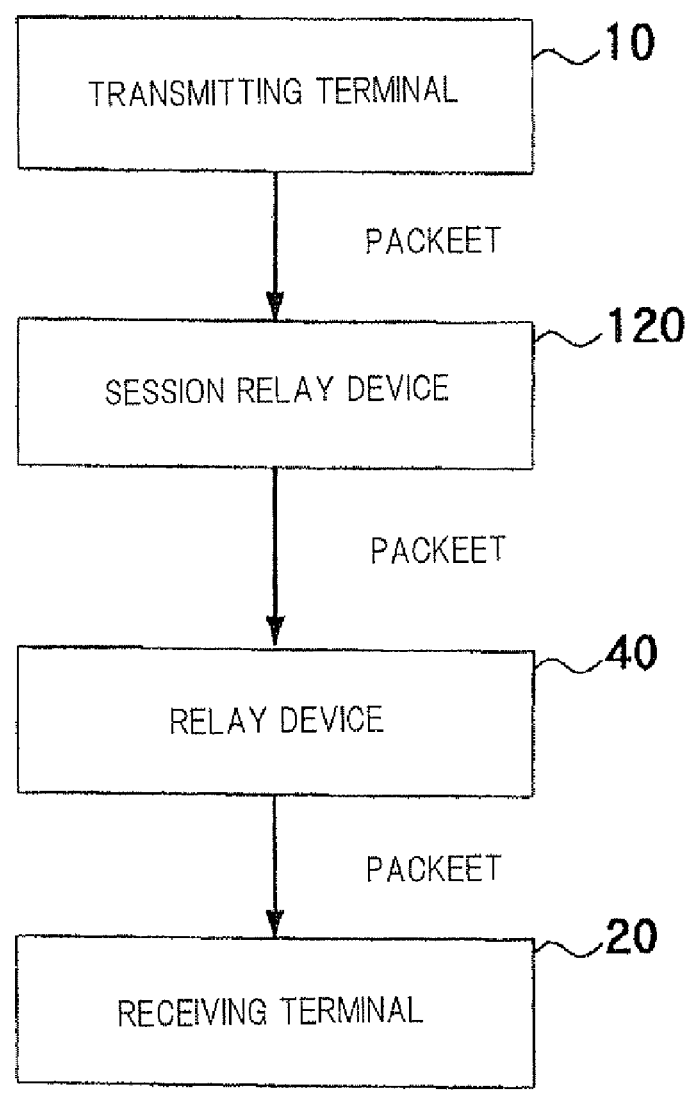
FIG. 15 is a block diagram showing a network configuration including the session relay device shown in FIG. 14.

FIG. 14 is a block diagram showing a configuration of a session relay device according to a second exemplary embodiment of the present invention. FIG. 15 is a block diagram showing a network configuration including the session relay device shown in FIG. 14.

In the network configuration shown in FIG. 15, relay device 40 is disposed between transmitting terminal 10 and receiving terminal 20, and session relay device 120 is disposed between transmitting terminal 10 and relay device 40. Transmitting terminal 10, receiving terminal 20, and relay device 40 are similar to those of the network configuration shown in FIG. 9. As with the first exemplary embodiment, a specific process for session relay device 120 to relay data that are transmitted from transmitting terminal 11 to receiving terminal 20 will be described below. For the sake of brevity, processing and configurational details required to open sessions will be omitted from illustration, and it is assumed that session data flow in one direction. The session opening process is performed in the manner described above with respect to the operation of the session relay device shown in FIG. 1.

As shown in FIG. 14, session relay device 120 according to the present exemplary embodiment comprises packet input section 120-1 for being supplied with a packet input from transmitting terminal 10, session relay section 120-3 for performing a session relay process for relaying the packet from packet input section 120-1, packet output section 120-4 for outputting the packet from session relay section 120-3 toward receiving terminal 20, packet input section 120-5 for being supplied with a packet from the side of receiving terminal 20, session packet determining section 120-6 for determining whether the packet from packet input section 120-5 is a session packet or not, transmission acknowledgement receiver 120-7 for receiving a transmission acknowledgement packet as a response packet of a session, session status holder 120-8 for holding the status of a session, transmission acknowledgement packet transfer/termination determining section 120-9 for determining whether it is to transfer the transmission acknowledgement packet or to terminate the transmission acknowledgement packet and perform a normal session relay process, transmission acknowledgement transmitter 120-10 for transmitting the transmission acknowledgement packet toward transmitting terminal 10 packet output section 120-11 for outputting a packet toward transmitting terminal 10, error report protocol terminator 120-12 for terminating an error report protocol, fragmentation request message transfer section 120-13 for removing a fragmentation request message of the error report protocol from error report protocol terminator 120-12 and delivering the fragmentation request message to transmitting terminal 10, and maximum transfer unit storing section 120-14 for storing a maximum transfer unit indicated by fragmentation request message transfer section 120-13.

In session relay device 120, a packet delivered from transmitting terminal 10 is supplied through packet input section 120-1 to session relay section 120-3. When the packet is input from packet input section 120-1 to session relay section 120-3, session relay section 120-3 performs a session relay process on the input packet.

Figure 16:
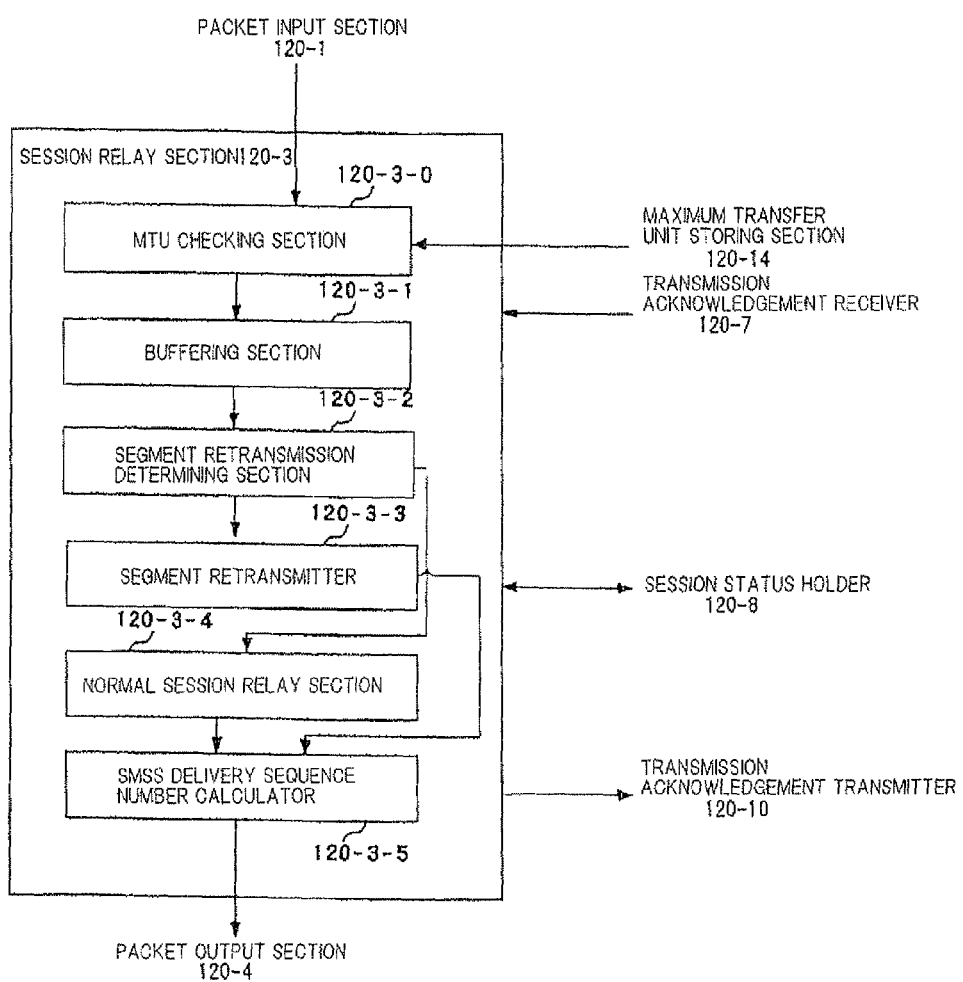
FIG. 16 is a block diagram showing a configuration of a session relay processor of a session relay section shown in FIG. 14.

FIG. 16 shows a configuration of a session relay processor of session relay section 120-3. As shown in FIG. 16, session relay section 120-3 comprises MTU checking section 120-3-0, buffering section 120-3-1, segment retransmission determining section 120-3-2, segment retransmitter 110-3-3, normal session relay section 120-3-4, and SMSS delivery sequence number calculator 120-3-5.

MTU checking section 120-3-0 updates the SMSS by referring session information, held in session status holder 120-8, with respect to a packet input through packet input section 120-1, and an MTU, stored in maximum transfer unit storing section 120-14, corresponding to the information of a destination or more. The term "information of a destination or more" refers to the information of a destination or the information of a destination and a source. In TCP represented as a session protocol, the information of a destination includes information representing (A-1) transmission address and (A-2) destination port, and the information of a source includes information representing (A-3) source address and (A-4) source port. The information of a destination or more includes at least the information (A-1), and may be either one of nine combinations shown below.

(1) only information (A-1)
(2) information (A-1)+(A-2)
(3) information (A-1)+(A-2)+(A-3)
(4) information (A-1)+(A-2)+(A-3)+(A-4)
(5) information (A-1)+(A-3)
(7) information (A-1)+(A-4)
(8) information (A-1)+(A-2)+(A-4)
(9) information (A-1)+(A-3)+(A-4)

Buffering section 120-3-1 buffers a packet from packet input section 120-1. Segment retransmission determining section 120-3-2 determines whether the buffered segment is a retransmitted segment with a changed segment size or not. Segment retransmitter 120-3-3 retransmits the retransmitted segment with the changed segment size. Normal session relay section 120-3-4 relays the segment which is not a retransmitted segment with a changed segment size. SMSS delivery sequence number calculator 120-3-5 calculates and updates a minimum sequence number equal to the SMSS. The term "a minimum sequence number equal to the SMSS" refers to a sequence number at the time a segment size according to TCP first reaches the SMSS. Specifically, if the SMSS is 1400 bytes and the following segments are exchanged:

sequence number=1, segment size=500
sequence number=101, segment size=500
sequence number=601, segment size=1000
sequence number=1601, segment size=1400
sequence number=3001, segment size=4401, then the minimum sequence number equal to the SMSS is "sequence number=1601".

In session relay section 120-3 thus constructed, segment retransmission determining section 120-3-2 determines whether a segment from transmitting terminal 10 is a retransmitted segment with a changed segment size or not. If the segment is a retransmitted segment with a changed segment size, then segment retransmitter 120-3-4 delivers the retransmitted segment toward receiving terminal 20 unconditionally or at an arbitrary timing including a retransmission. The term "a retransmitted segment with a changed segment size" refers to a retransmitted segment having the same starting sequence number and a different segment size. To the determining condition of segment retransmission determining section 120-3-2, there may be added a condition that a retransmitted segment has not yet reached receiving terminal 20, or a condition that a retransmitted segment size is the SMSS or smaller, or a condition that both the above conditions are satisfied.

In session relay section 120-3, SMSS delivery sequence number calculator 120-3-5 stores a minimum transmission sequence number (hereinafter, a minimum sequence number corresponding to a maximum delivery segment) whose delivery segment size is equal to the SMSS, in session status holder 120-8. A condition that the maximum segment size acknowledged for transmission is less than a maximum segment size which has been registered in session status holder 120-8 that was negotiated when the session was opened, may be added as an updating condition.

An operation sequence of storing a minimum transmission sequence number whose delivery segment size is equal to the SMSS will be briefly described below.

If the MTU of the route ahead of relay device 40 is 1000, and transmitting terminal 10 transmits data of 1500 bytes as two segments, i.e., a segment of 960 bytes and a segment of 540 bytes (the header size of 40 bytes), transmitting terminal 10 successively delivers a packet (sequence number "1") including the segment of 960 bytes and a packet (sequence number "2") including the segment of 540 bytes. When session relay section 120-3 receives the first packet (sequence number "1"), it buffers the segment of 960 bytes and updates the SMSS into 960 bytes. Then, the buffered segment of 960 bytes is delivered toward the receiving terminal. In this operation, the delivery segment size becomes equal to the SMSS.

When session relay section 120-3 receives the second packet (sequence number "2"), it buffers the segment of 540 bytes, but leaves the SMSS as 960. This is because the timing of updating the SMSS is the same as the timing of updating the MTU. The buffered segment of 540 bytes is delivered toward receiving terminal 20.

In the operation to receive the above two packets, the minimum transmission sequence number whose delivery segment size is equal to the SMSS is set to the transmission sequence number "1" at the time the first packet (sequence number "1") is received, and the transmission sequence number "1" is stored in session status holder 120-8.

In session relay device 120 shown in FIG. 14, a packet delivered from receiving terminal 20 or relay device 40 is supplied through packet input section 120-5 to session packet determining section 120-6. When the packet is input from packet input section 120-5 to session packet determining section 120-6, session packet determining section 120-6 determines whether the input packet is a session packet registered in session status holder 120-8 or not. If the input packet is a session packet, then session packet determining section 120-6 transfers the input packet (transmission acknowledgement packet) to transmission acknowledgement receiver 120-7. If the input packet is not a session packet, then session packet determining section 120-6 transfers the input packet (error report protocol) to error report protocol terminator 120-12.

When the session packet (transmission acknowledgement packet) is supplied from session packet determining section 120-6 to transmission acknowledgement receiver 120-7, transmission acknowledgement packet transfer/termination determining section 120-9 determines whether it is to transfer the transmission acknowledgement packet to packet output section 120-11 or to terminate the transmission acknowledgement packet and perform a normal session relay process.

Figure 17:
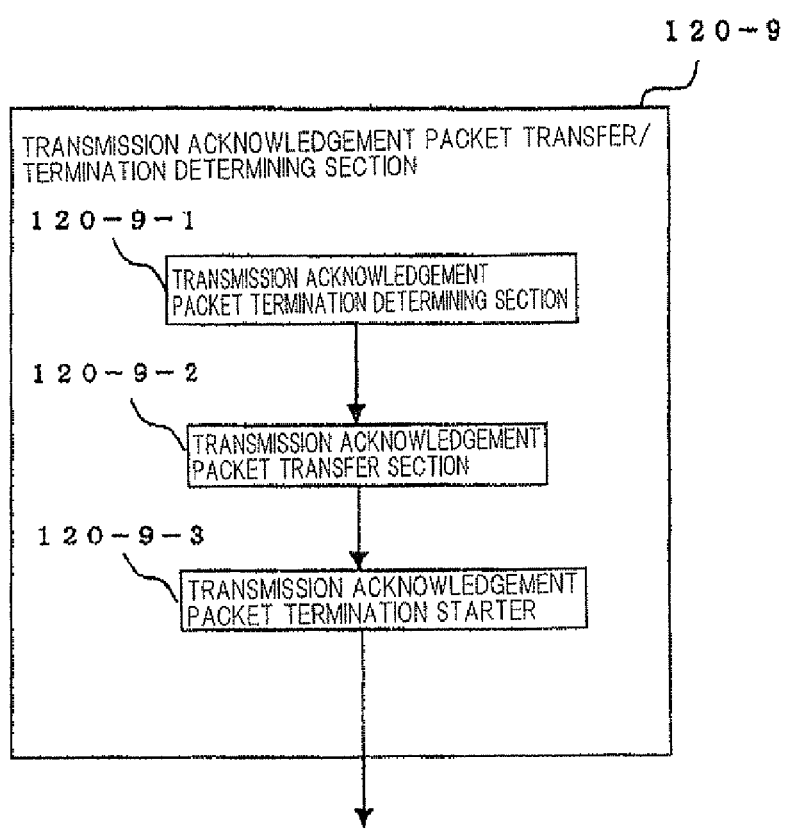
FIG. 17 is a block diagram showing a configuration of a transmission acknowledgement packet transfer/termination determining section shown in FIG. 14.

FIG. 17 shows a central portion of transmission acknowledgement packet transfer/termination determining section 120-9. As shown in FIG. 17, transmission acknowledgement packet transfer/termination determining section 120-9 comprises transmission acknowledgement packet termination determining section 120-9-1 for determining the start of the termination of the transmission acknowledgement packet based on the SMSS, transmission acknowledgement packet transfer section 120-9-2 for transferring the transmission acknowledgement packet, and transmission acknowledgement packet termination starter 120-9-3 for starting the normal session relay process and stopping the transfer of the transmission acknowledgement packet.

Transmission acknowledgement packet termination determining section 120-9-1 determines whether or not the maximum sequence number N1 acknowledged for transmission of the transmission acknowledgement packet from receiving terminal 20 is equal to or greater than a minimum sequence number N2 corresponding to the maximum delivery segment (N1≧N2 or not), Since the maximum sequence number N1 has not yet reached the minimum sequence number N2 (N1<N2) immediately after the session has been opened, transmission acknowledgement packet transfer section 120-9-2 transfers the transmission acknowledgement packet from transmission acknowledgement receiver 120-7 to packet output section 120-11, and transmission acknowledgement transmitter 120-10 does not deliver the transmission acknowledgement packet. After the maximum sequence number N1 has reached the minimum sequence number N2 (N1≧N2), transmission acknowledgement packet transfer section 120-9-2 does not transfer the transmission acknowledgement packet, and transmission acknowledgement packet termination starter 120-9-3 terminates the transmission acknowledgement packet from the reception side, causing transmission acknowledgement transmitter 120-10 to start transmitting the transmission acknowledgement packet.

Figure 4:
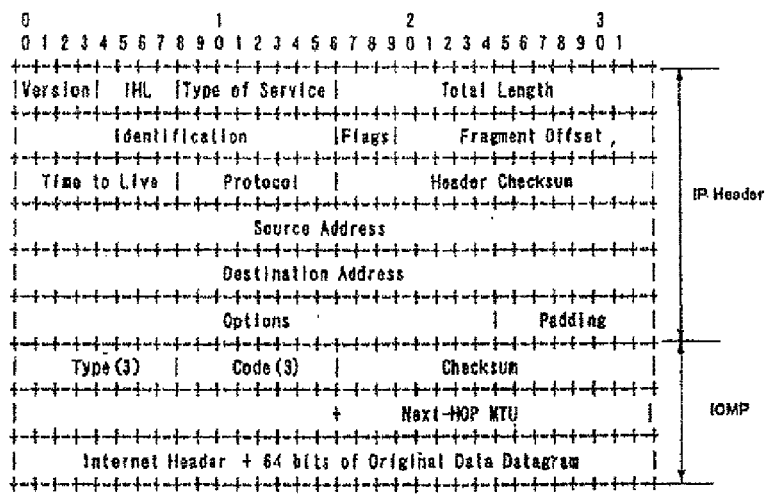
FIG. 4 is a diagram illustrative of a packet configuration of an ICMP Destination Unreachable/fragmentation request message.
Figure 5:
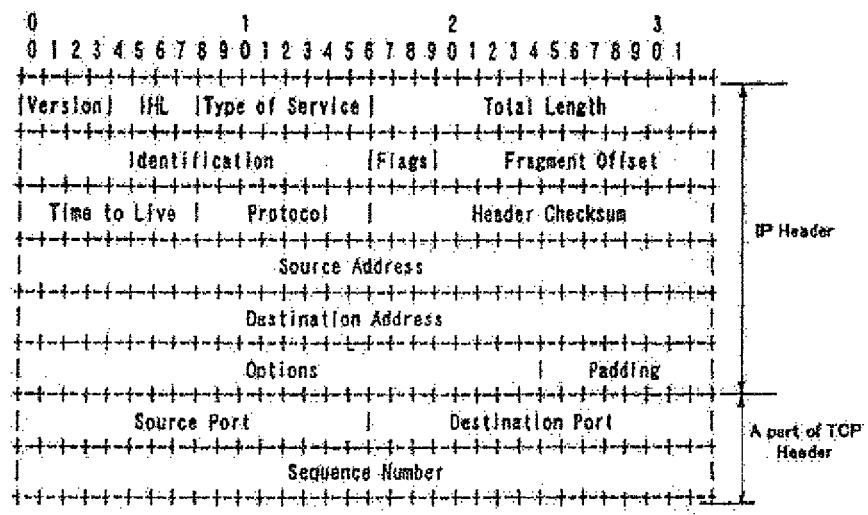
FIG. 5 is a diagram illustrative of a configuration of a PET part which has caused an error that is included in the ICMP Destination Unreachable/fragmentation request message.
Figure 6:
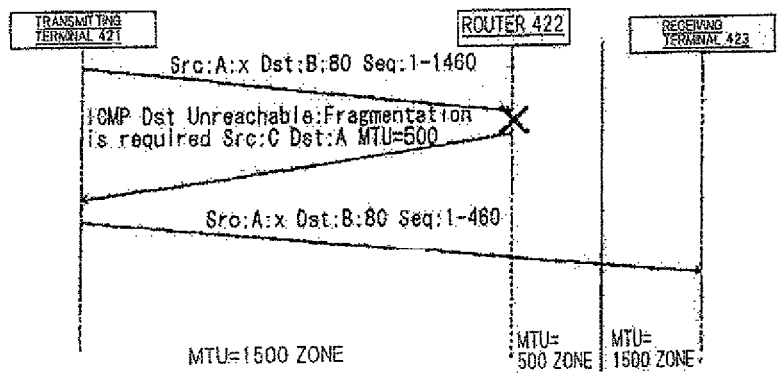
FIG. 6 is a diagram illustrative of an operation based on Path MTU discovery of the double-sided-transmission session relay device of the related art.
Figure 7:
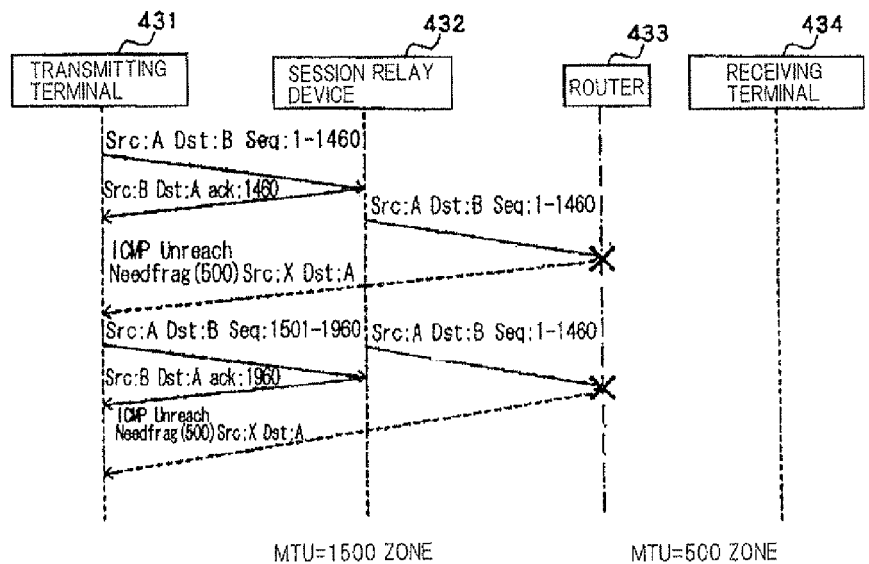
FIG. 7 is a diagram illustrative of Path MTU discovery problems which the double-sided-transmission session relay device of the related art suffers according to TCP.

When the packet (error report protocol) is supplied from session packet determining section 120-6 to error report protocol terminator 120-12, error report protocol terminator 120-12 terminates the error report protocol. Then, fragmentation request message transfer section 120-13 removes a fragmentation request message of the error report protocol from error report protocol terminator 120-12 and delivers the fragmentation request message to transmitting terminal 10, reads the "maximum transfer unit of a next hop" in the removed fragmentation request message, and updates the information of the maximum transfer unit per information of the destination or more stored in maximum transfer unit storing section 120-14, with the read "maximum transfer unit of a next hop". The "maximum transfer unit in the fragmentation request message" refers to "Next-HOP MTU" shown in FIG. 4 if according to TCP/IP, for example. The "information of the destination or more" is the information in "Internet Header+64 bits of Original Data Datagram" shown in FIG. 4, and refers to the information of "Source Address", "Source Port", and "Destination Port" including at least "Destination Address" shown in FIG. 5.

Session relay section 120-3 searches maximum transfer unit storing section 120-14 using the "information of the destination or more" of the session being relayed as a key, and determines whether the maximum transfer unit in maximum transfer unit storing section 120-14 has been updated or not. If the maximum transfer unit has been updated, then session relay section 120-3 updates the SMSS based on the updated maximum transfer unit. Specifically, if a certain session is represented by "Src Addr: 192.168.11", "Src Port. 1234", "Dst Addr: 192.168.2.1", and "Dst Prot: 5001", and the information of the destination or more is represented by only "Dst Addr", then session relay section 120-3 searches maximum transfer unit storing section 120-14 for the maximum transfer unit using "192.168.2.1" as a key. If the maximum transfer unit of "192.168.2.1" in maximum transfer unit storing section 120-14 has been changed, then session relay section 120-3 updates the SMSS based on the changed information. Session relay section 120-3 updates the SMSS with "maximum transfer unit" "header size", for example. Session relay section 120-3 changes headers, and if the reception header size on the side of transmitting terminal 10 and the transmission header size on the side of receiving terminal 20 are different from each other, then the "header size" is set to the maximum value of the reception header size and the transmission header size.

The MTU and the segment size are related to each other such that MTU≦"header size"+"segment size". The header size is determined by the header size at the time the communications are opened. If the MTU of the overall route is of 1000 bytes, the reception header size on the side of transmitting terminal 10 is of 50 bytes, and the transmission header size on the side of receiving terminal 20 is of 60 bytes, then the SMSS from the side of transmitting terminal 10 is of 940 bytes. If the segment from the side of transmitting terminal 10 is of 950 bytes, then since session relay section 120-3 changes headers, the packet size toward the side of receiving terminal 20 is of 1010 bytes, exceeding the MTU of the overall route. As no communications are possible, the SMSS is not set to 950 bytes. Conversely, if the MTU of the overall route is of 1000 bytes, the reception header size on the side of transmitting terminal 10 is of 60 bytes, and the transmission header size on the side of receiving terminal 20 is of 50 bytes, then the SMSS from the side of transmitting terminal 10 is of 940 bytes. If the segment from the side of transmitting terminal 10 is of 950 bytes, then the packet size is of 1010 bytes, exceeding the MTU of the overall route. As a result, as the packet does not reach the relay device, the SMSS is not set to 950 bytes.

Figure 18:
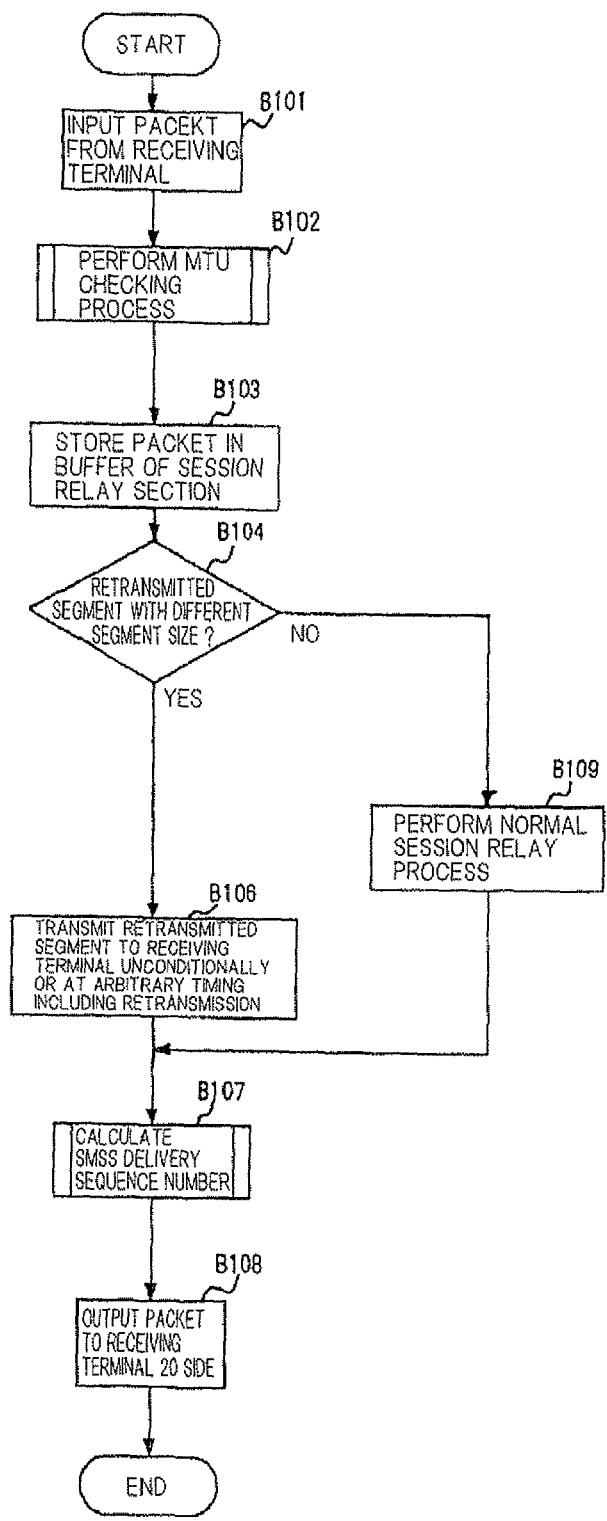
FIG. 18 is a flowchart illustrative of an operation of the session relay section shown in FIG. 14.
Figure 19:
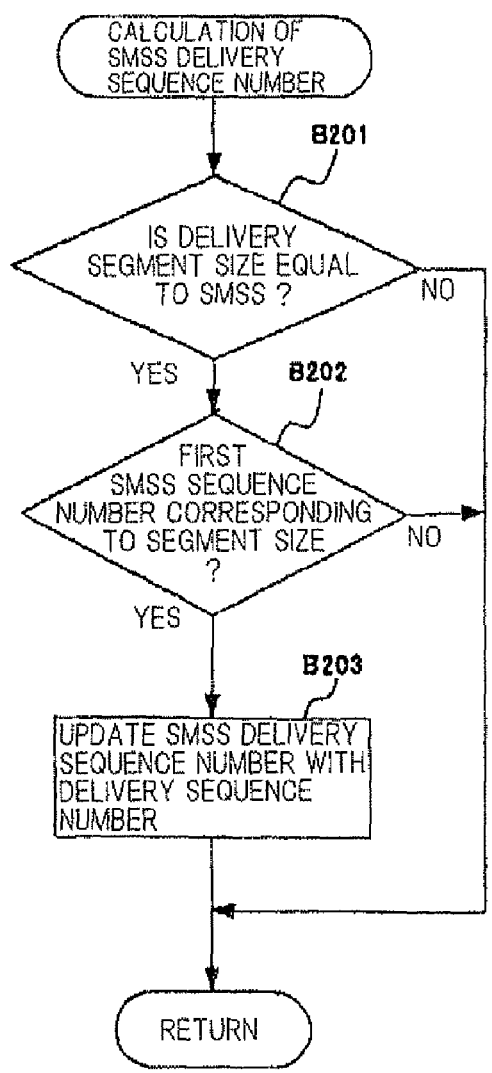
FIG. 19 is a flowchart illustrative of an operation of an MSS delivery sequence number calculator shown in FIG. 16.
Figure 20:
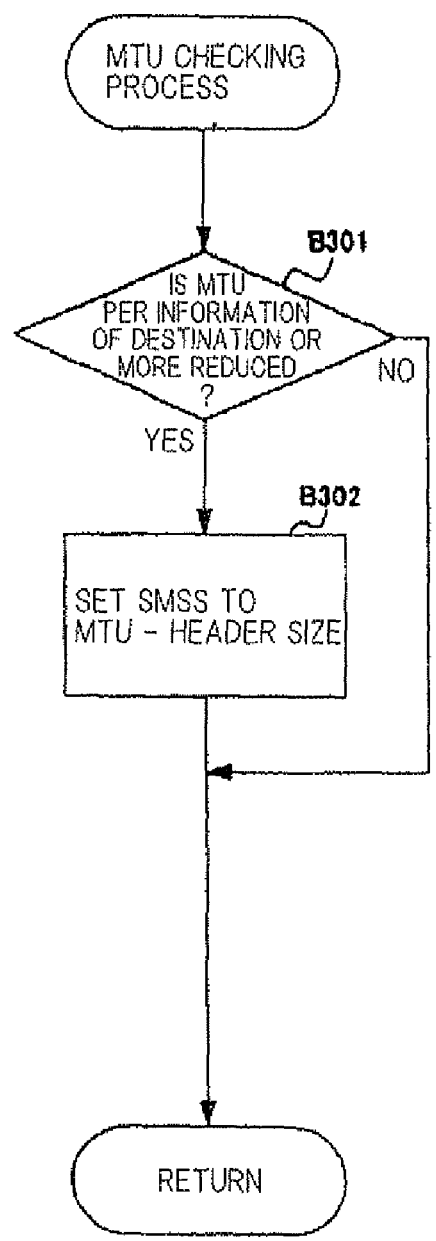
FIG. 20 is a flowchart illustrative of an operation of an MTU checking section shown in FIG. 16.
Figure 21:
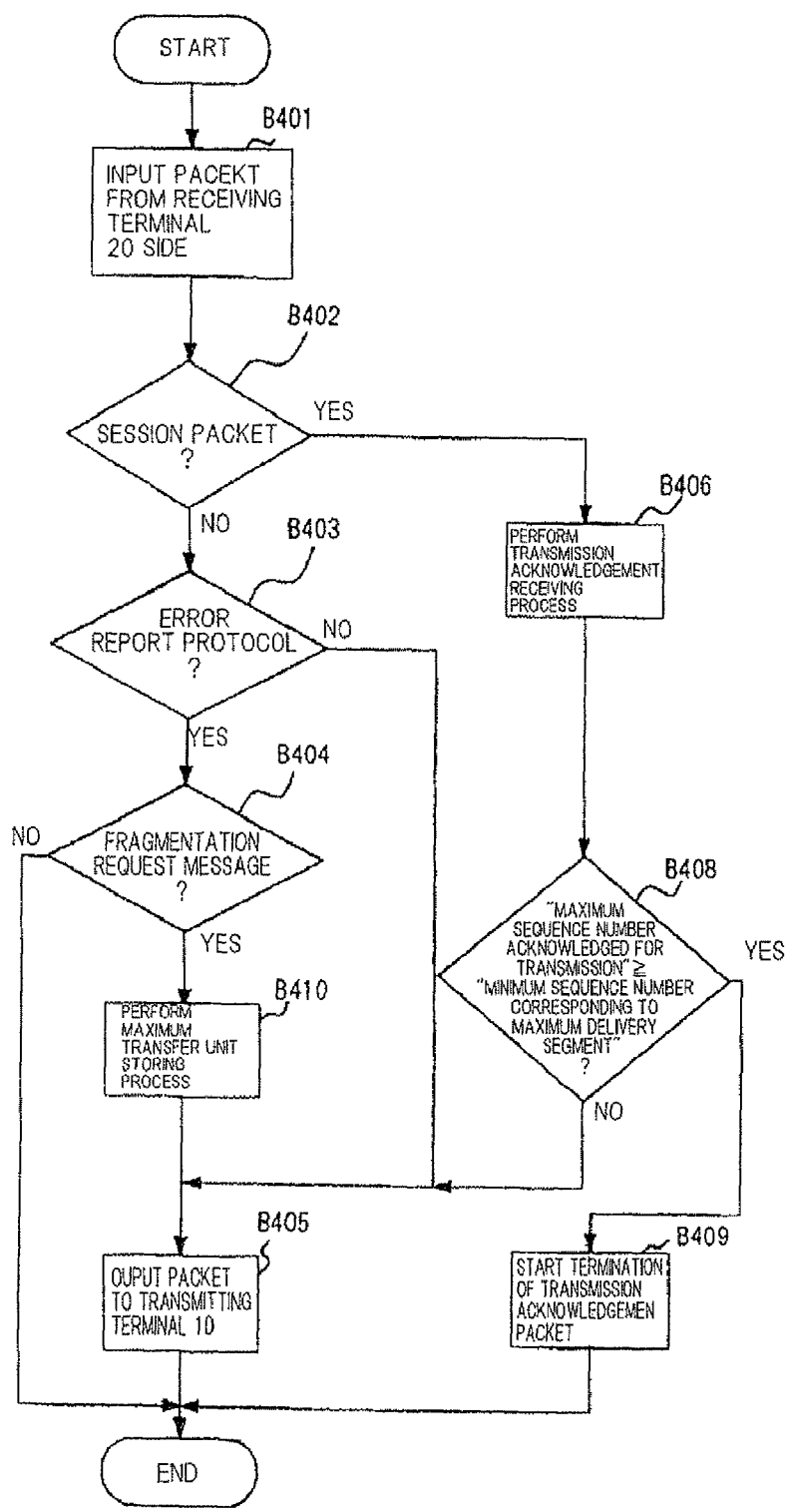
FIG. 21 is a flowchart illustrative of an operation of the transmission acknowledgement packet transfer/termination determining section shown in FIG. 14.

Specific operational details of the session relay device according to the present exemplary embodiment will be described below. FIG. 18 shows an operation of the session relay device according to the present exemplary embodiment with respect to the direction of communications from transmitting terminal 10 to receiving terminal 20. FIG. 19 shows an operation of an MSS delivery sequence number calculating process. FIG. 20 shows an operation of an MTU checking process. FIG. 21 shows an operation of the session relay device according to the present exemplary embodiment with respect to the direction of communications from receiving terminal 20 to transmitting terminal 10.

First, an operation of session relay device 120 upon arrival of a data packet from transmitting terminal 10 immediately after the session opening process is finished will be described below with reference to FIG. 18.

Immediately after the session has been opened, transmission acknowledgement packet transfer section 120-9-2 transfers the transmission acknowledgement packet from transmission acknowledgement receiver 120-7 to packet output section 120-11, and transmission acknowledgement transmitter 120-10 does not deliver the transmission acknowledgement packet. At this stage, the SMSS represents a maximum segment size which was negotiated when the session was opened. The MTU per information of the destination represents the maximum size of a normal packet.

The packet delivered from transmitting terminal 10 is supplied through packet input section 120-1 to session relay section 120-3 (step B101). When the packet is input from transmitting terminal 10 to session relay section 120-3, MTU checking section 120-3-0 performs an MTU checking process (step B102), and the supplied packet is buffered and held by buffering section 120-3-1 (step B103).

According to the MTU checking process performed by MTU checking section 120-3-0, as shown in FIG. 20, it is first determined whether the MTU per information of the destination is has been reduced or not (step B301). Since the MTU has not yet been reduced at this stage, step B301 judges "NO", and the MTU checking process is finished.

After the packet from transmitting terminal 10 is buffered and held by buffering section 120-3-1, segment retransmission determining section 120-3-2 determines whether the segment held by buffering section 120-3-1 is a retransmitted segment with a different segment size or not (step B104). At this stage, since the segment held by buffering section 120-3-1 is not a retransmitted segment with a different segment size, step B104 judges "NO".

When step B104 judges "NO", normal session relay section 120-3-4 performs a normal session relay process (B109). In the normal session relay process, the packet segment held by buffering section 120-3-1 is output to packet output section 120-4. Then, SMSS delivery sequence number calculator 120-3-5 performs an SMSS delivery sequence number calculating process on the packet output to packet output section 120-4 (step B107).

In the SMSS delivery sequence number calculating process in step B107, as shown in FIG. 19, it is first determined whether the delivery segment size is equal to the SMSS or not (step B201). Since the delivery segment size is equal to the SMSS at this stage, step B201 judges "YES". When step B201 judges "YES", it is then determined whether the sequence number is the first SMSS delivery sequence is number corresponding to the segment size or not (step B202). Since the sequence number is the first SMSS delivery sequence number at this stage, step B202 judges "YES". When step B202 judges "YES", the SMSS delivery sequence number is updated with a delivery sequence number (step B203).

After the SMSS delivery sequence number calculating process in step B107 has been carried out, packet output section 120-4 outputs the packet toward receiving terminal 20 (step B108).

The segment delivered from segment relay device 120 toward receiving terminal 20 is received by relay device 40. If the size of the received segment is greater than the MTU, then relay device 40 delivers a fragmentation request message of an error report protocol toward transmitting terminal 10. The fragmentation request message of the error report protocol is received by session relay device 120.

An operation of session relay device 120 upon reception of the fragmentation request message of the error report protocol from relay device 40 will be described below with reference to FIG. 21.

The packet from the side of receiving terminal 20 is input to packet input section 120-5 (step B401). The packet input to packet input section 120-5 is supplied to session packet determining section 120-6, which determines whether the input packet is a session packet or not (step B402). Since the packet from the side of receiving terminal 20 is the fragmentation request message of the error report protocol delivered from relay device 40 toward transmitting terminal 10 at this stage, step B402 judges "NO".

When step B402 judges "NO", session packet determining section 120-6 transfers the input packet from packet input section 120-5 to error report protocol terminator 120-12, which determines whether the input packet is an error report protocol or not (step B403). Since the input packet is the fragmentation request message of the error report protocol delivered from relay device 40 toward transmitting terminal 10, step B403 judges "YES".

When step B403 judges "YES", error report protocol terminator 120-12 transfers the input packet from packet input section 120-5 to fragmentation request message transfer section 120-13, which determines whether the supplied packet is a fragmentation request message or not (step B404). Since the packet supplied to error report protocol terminator 120-12 is the fragmentation request message at this stage, step B404 judges "YES".

When step B404 judges "YES", fragmentation request message transfer section 120-13 removes the fragmentation request message of the error report protocol from error report protocol terminator 120-12, and updates the maximum transfer unit per information of the destination or more which is stored in maximum transfer unit storing section 120-14 based on the maximum transfer unit in the removed fragmentation request message (step B410). Then, fragmentation request message transfer section 120-13 delivers the removed fragmentation request message through packet output section 120-11 to transmitting terminal 10 (step B405).

Having received the fragmentation request message from session relay device 120, transmitting terminal 10 retransmits a packet with a reduced segment size toward receiving terminal 20 according to the received fragmentation request message.

An operation of session relay device 120 upon arrival of the is packet with the reduced segment size from transmitting device 10 will be described below with reference to FIG. 18.

The packet from transmitting terminal 10 is supplied through packet input section 120-1 to session relay section 120-3 (step B101). When the packet is input from transmitting terminal 10 to session relay section 120-3, MTU checking section 120-3-0 performs an MTU checking process (step B102), and the supplied packet is buffered and held by buffering section 120-3-1 (step B103).

According to the MTU checking process performed by MTU checking section 120-3-0, as shown in FIG. 20, it is first determined whether the MTU per information of the destination has been reduced or not (step B301). Since the MTU has been reduced at this stage, step B301 judges "YES". When step B301 judges "YES", the MTU checking section 120-3-0 then sets the SMSS to the value of ["MTU"–"header size"]. Thereafter, the MTU checking process is finished.

After the packet from transmitting terminal 10 is buffered and held by buffering section 120-3-1, segment retransmission determining section 120-3-2 determines whether the segment held by buffering section 120-3-1 is a retransmitted segment with a different segment size or not (step B104). At this stage, since the segment held by buffering section 120-3-1 is a retransmitted segment with a different segment size, step B104 judges "YES".

When step B104 judges "YES", segment retransmitter 120-3-3 retransmits the packet segment held by buffering section 120-3-1 to packet output section 120-4 unconditionally or at an arbitrary timing including a retransmission (step B106). Then, SMSS delivery sequence number calculator 120-3-5 performs an SMSS delivery sequence number calculating process on the packet output to packet output section 120-4 (step B107).

In the SMSS delivery sequence number calculating process in step B107, as shown in FIG. 19, it is first determined whether the delivery segment size is equal to the SMSS or not (step B201). Since the delivery segment size is equal to the SMSS at this stage, step B201 judges "YES". When step B201 judges "YES", it is then determined whether the sequence number is the first SMSS delivery sequence number corresponding to the segment size or not (step B202). Since the sequence number is the first SMSS delivery sequence number at this stage, step B202 judges "YES". When step B202 judges "YES", the SMSS delivery sequence number is updated with a delivery sequence number (step B203).

After the SMSS delivery sequence number calculating process in step B107 has been carried out, packet output section 120-4 outputs the packet toward receiving terminal 20 (step B108).

Inasmuch as the size of the retransmitted segment transmitted from packet output section 120-4 is the size according to the fragmentation request message that relay device 40 has returned to the source, the retransmitted segment passes through relay device 40 and reaches receiving terminal 20. Upon reception of the retransmitted segment, receiving terminal 20 transmits a transmission acknowledgement packet which is a response packet therefor toward transmitting terminal 10. The transmission acknowledgement packet is transmitted through relay device 40 and received by session relay device 120.

An operation of session relay device 120 upon reception of the transmission acknowledgement packet from receiving terminal 20 will be described below with reference to FIG. 21.

The packet from the side of receiving terminal 20 is input to packet input section 120-5 (step B401). The packet input to packet input section 120-5 is supplied to session packet determining section 120-6, which determines whether the input packet is a session packet or not (step B402). Since the packet from the side of receiving terminal 20 is the transmission acknowledgement packet (session packet) transmitted from receiving terminal 20 toward transmitting terminal 10, step B402 judges "YES".

When step B402 judges "YES", session packet determining section 120-6 transfers the input packet from packet input section 120-5 to transmission acknowledgement receiver 120-7, which performs a transmission acknowledgement receiving process (step B406). Then, transmission acknowledgement packet termination determining section 120-9-1 determines whether the condition that "the maximum sequence number acknowledged for transmissions"≧"the minimum sequence number corresponding to the maximum delivery segment" is satisfied or not (step B408). Since the condition is satisfied at this stage, transmission acknowledgement packet transfer section 120-9-2 indicates the start of a transmission acknowledgement process to transmission acknowledgement transmitter 120-10 (step B409). Thereafter, the transmission acknowledgement packet is not transferred to transmitting terminal 10. As a result, the transmission acknowledgement packet is terminated by session relay device 120.

With the session relay device according to the second exemplary embodiment described above, as with the first exemplary embodiment, a retransmitted segment from transmitting terminal 10 is necessarily transmitted to relay device 40. Accordingly, the session relay device can maintain stable communications between transmitting terminal 10 and receiving terminal 20 without causing communications failures.

Furthermore, since a transmission acknowledgement packet from the reception side is transferred directly to the transmitting terminal immediately after the session has been opened, the session relay device can avoid a deadlock due to an overflow of packets from the transmitting terminal.

3rd Exemplary Embodiment

Figure 22:
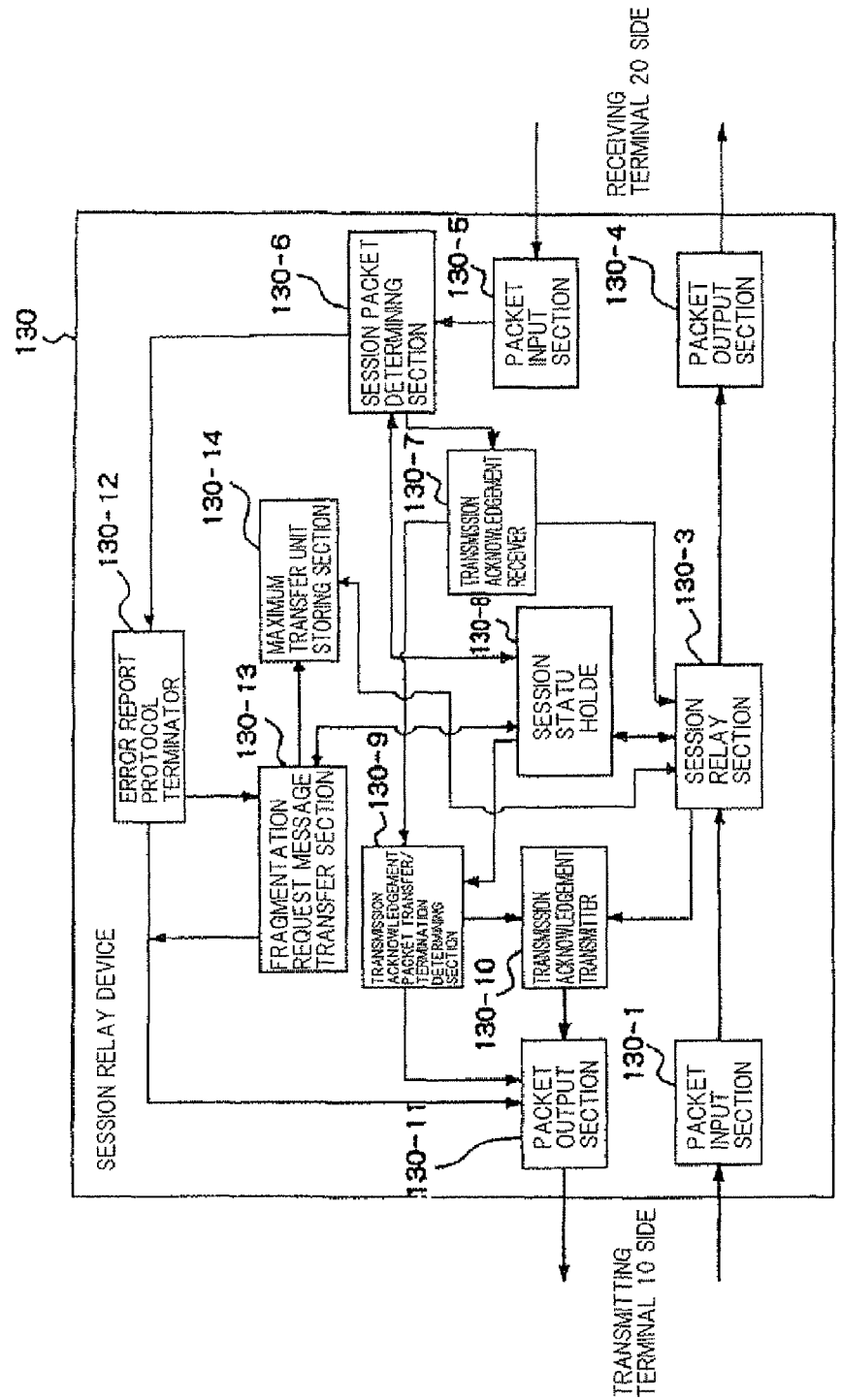
FIG. 22 is a block diagram showing a configuration of a session relay device according to a third exemplary embodiment of the present invention.
Figure 23:
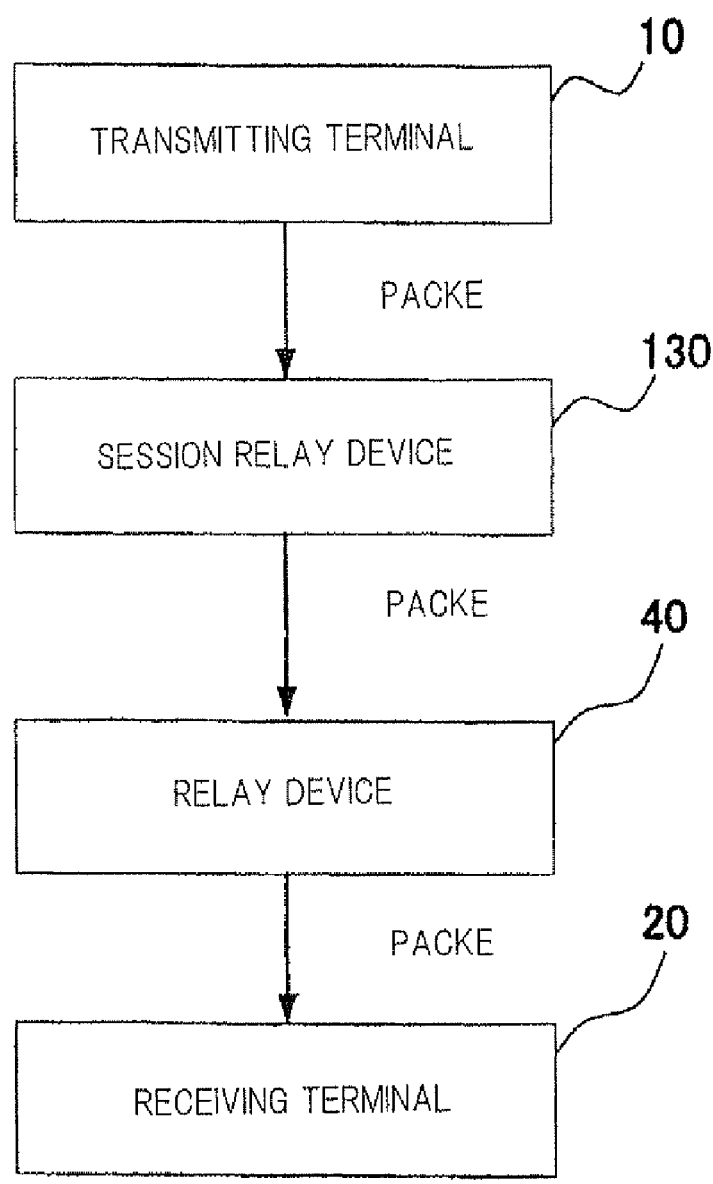
FIG. 23 is a block diagram showing a network configuration including the session relay device shown in FIG. 22.

FIG. 22 is a block diagram showing a configuration of a session relay device according to a third exemplary embodiment of the present invention. FIG. 23 is a block diagram showing a network configuration including the session relay device shown in FIG. 22.

In the network configuration shown in FIG. 22, relay device 40 is disposed between transmitting terminal 10 and receiving terminal 20, and session relay device 130 is disposed between transmitting terminal 10 and relay device 40. Transmitting terminal 10, receiving terminal 20, and relay device 40 are similar to those of the network configurations according to the first and second exemplary embodiments described above. A specific process for session relay device 130 to relay data that are transmitted from transmitting terminal 10 to receiving terminal 20 will be described below. For the sake of brevity, processing and configurational details required to open sessions will be omitted from illustration, and it is assumed that session data flow in one direction. The session opening process is performed in the manner described above with respect to the operation of the session relay device shown in FIG. 1.

As shown in FIG. 22, session relay device 130 according to the present exemplary embodiment comprises packet input section 130-1 for being supplied with a packet input from transmitting terminal 10, session relay section 130-3 for performing a session relay process for relaying the packet from packet input section 130-1, packet output section 130-4 for outputting the packet from session relay section 130-3 toward receiving terminal 20, packet input section 130-5 for being supplied with a packet from the side of receiving terminal 20, session packet determining section 130-6 for determining whether the packet from packet input section 130-5 is a session packet or not, transmission acknowledgement receiver 130-7 for receiving a transmission acknowledgement packet as a response packet of a session, session status holder 130-8 for holding the status of a session, transmission acknowledgement packet transfer/termination determining section 130-9 for determining whether it is to transfer the transmission acknowledgement packet or to terminate the transmission acknowledgement packet and perform a normal session relay process, transmission acknowledgement transmitter 130-10 for transmitting the transmission acknowledgement packet toward transmitting terminal 10, packet output section 130-11 for outputting a packet toward transmitting terminal 10, error report protocol terminator 130-12 for terminating an error report protocol, fragmentation request message transfer section 130-13 for removing a fragmentation request message of the error report protocol from error report protocol terminator 130-12 and delivering the fragmentation request message to transmitting terminal 10, and maximum transfer unit storing section 130-14 for storing a maximum transfer unit indicated by fragmentation request message transfer section 130-13.

Session relay device 130 according to the present exemplary embodiment is basically the same as the second exemplary embodiment except for the configurations of session relay section 130-3 and fragmentation request message transfer section 130-13.

Figure 24:
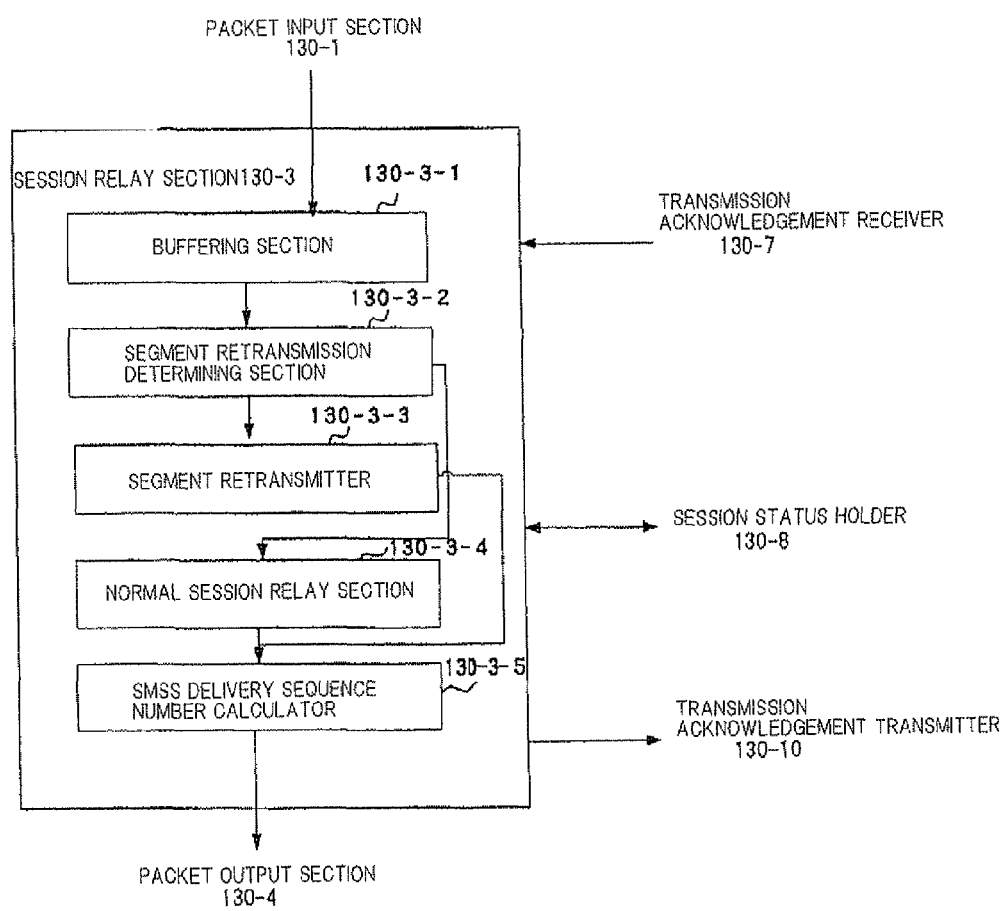
FIG. 24 is a block diagram showing a configuration of the session relay device shown in FIG. 22.

FIG. 24 shows a configuration of session relay section 130-3. As shown in FIG. 24, session relay section 130-3 comprises buffering section 130-3-1 for buffering a packet from packet input section 130-1, segment retransmission determining section 130-3-2 for determining whether the segment buffered by buffering section 130-3-1 is a retransmitted segment with a changed segment size or not, segment retransmitter 130-3-3 for retransmitting the retransmitted segment with the changed segment size, normal session relay section 130-3-4 for relaying the segment which is not a retransmitted segment with a changed segment size, and SMSS delivery sequence number calculating process 130-3-5 for calculating and updating a minimum sequence number equal to the SMSS.

In session relay section 130-3, segment retransmission determining section 130-3-2 determines whether a segment from transmitting terminal 10 is a retransmitted segment with a changed segment size or not. If the segment is a retransmitted segment with a changed segment size, then segment retransmitter 130-3-4 retransmits the packet of the retransmitted segment toward receiving terminal 20 unconditionally or at an arbitrary timing including a retransmission. The term "a retransmitted segment with a changed segment size" refers to a retransmitted segment having the same starting sequence number and a different segment size. To the determining condition of segment retransmission determining section 130-3-2, there may be added a condition that a retransmitted segment has not yet reached receiving terminal 20, or a condition that a retransmitted segment size is the SMSS or smaller, or a condition that both the above conditions are satisfied.

In session relay section 130-3, SMSS delivery sequence number calculator 130-3-5 stores a minimum transmission sequence number (hereinafter, a minimum sequence number corresponding to a maximum delivery segment) whose delivery segment size is equal to the SMSS, in session status holder 130-8. A condition that the maximum segment size acknowledged for transmission is less than a maximum segment size which has been registered in session status holder 130-8 that was negotiated when the session was opened, may be added as an updating condition.

Figure 25:
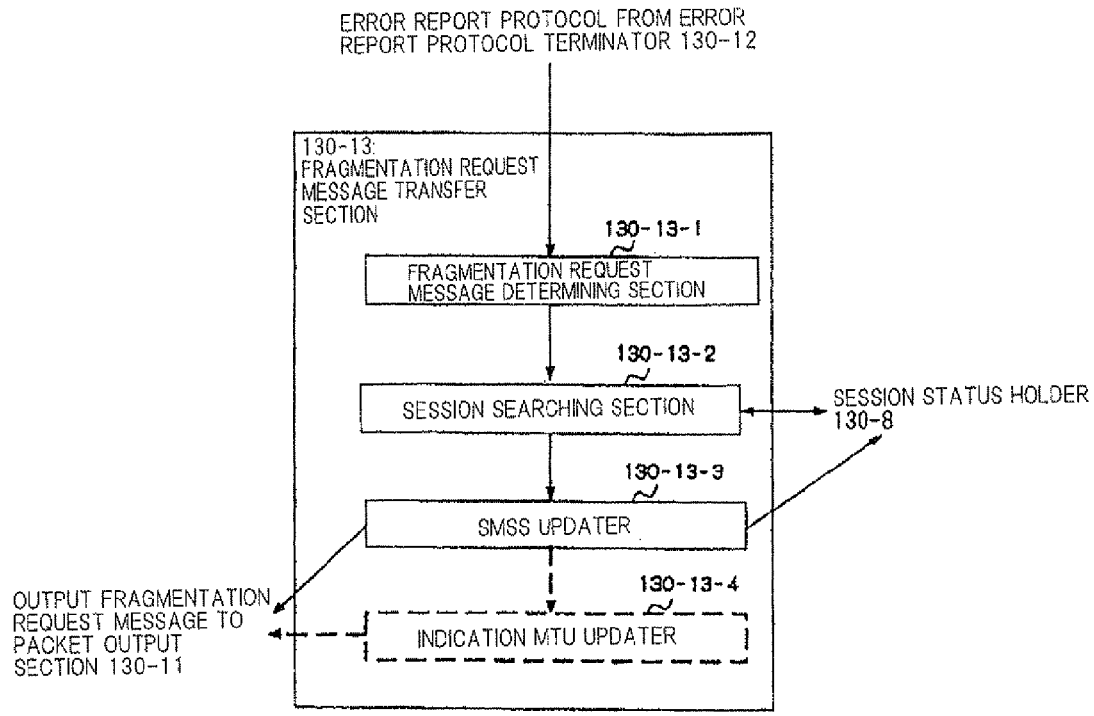
FIG. 25 is a block diagram showing a configuration of a fragmentation request message transfer section shown in FIG. 22.

FIG. 25 shows a configuration of fragmentation request message transfer section 130-13. Fragmentation request message transfer section 130-13 comprises fragmentation request message determining section 130-13-1, session searching section 130-13-2, SMSS updater 130-13-3, and indication MTU updater 130-13-4. Indication MTU updater 130-13-4 may be dispensed with.

Fragmentation request message determining section 130-13-1 determines whether an error report protocol from error report protocol terminator 130-12 is a fragmentation request message or not. If the error report protocol is a fragmentation request message, then session searching section 130-13-2 searches the information in session status holder 130-8 based on the information of the destination/source including port numbers in the error packet header in the message. For searching session information, it may be checked to see if a condition that "the maximum sequence number acknowledged for transmission of the transmission acknowledgement packet from receiving terminal 20"≦"the transmission sequence number in the error packet header2≦"the maximum value of transmitted transmission sequence numbers" is satisfied or not.

SMSS updater 130-13-3 reads the "maximum transfer unit of a next hop" in the fragmentation request message, and updates the SMSS held by session status holder 180-8 by setting the SMSS of the session being relayed to the value ["maximum transfer unit of a next hop"−"header size". If the header sizes on the sides transmitting terminal 10 and receiving terminal 20 are different from each other, then this header size is represented by the maximum value of the two header sizes. The "maximum transfer unit" is stored in maximum transfer unit storing section 130-14. If indication MTU updater 130-13-4 is dispensed with, then SMSS updater 130-13-3 outputs the fragmentation request message to packet output section 130-11.

If the header sizes on the sides transmitting terminal 10 and receiving terminal 20 are different from each other, then indication MTU updater 130-13-4 indicates a value produced by subtracting the header size from the maximum transfer unit in the fragmentation request message to be indicated to the transmitting terminal.

Figure 26:
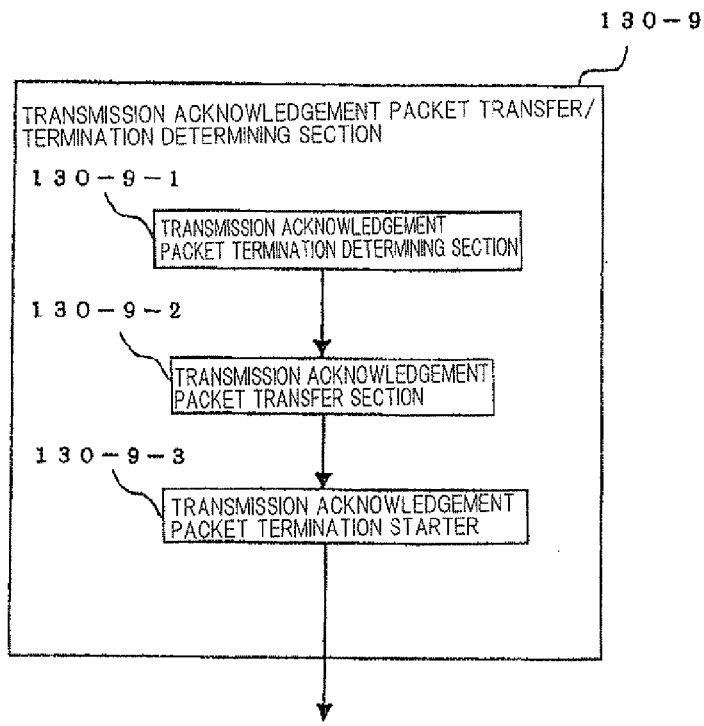
FIG. 26 is a block diagram showing a configuration of a transmission acknowledgement packet transfer/termination determining section shown in FIG. 22

FIG. 26 shows a central portion of transmission acknowledgement packet transfer/termination determining section 130-9. As shown in FIG. 26, transmission acknowledgement packet transfer/termination determining section 130-9 comprises transmission acknowledgement packet termination determining section 130-9-1 for determining the start of the termination of the transmission acknowledgement packet based on the SMSS, transmission acknowledgement packet transfer section 130-9-2 for transferring the transmission acknowledgement packet, and transmission acknowledgement packet termination starter 130-9-3 for starting the normal session relay process and stopping the transfer of the transmission acknowledgement packet.

Transmission acknowledgement packet termination determining section 130-9-1 determines whether or not the maximum sequence number acknowledged for transmission of the transmission acknowledgement packet from receiving terminal 20 reaches a minimum sequence number corresponding to the maximum delivery segment. Immediately after the session has been opened, transmission acknowledgement packet transfer section 130-9-2 transfers the transmission acknowledgement packet from transmission acknowledgement receiver 130-7 to packet output section 130-11, and transmission acknowledgement transmitter 130-10 does not deliver the transmission acknowledgement packet. After the maximum sequence number acknowledged for transmission has reached the minimum sequence number corresponding to the maximum delivery segment, transmission acknowledgement packet transfer section 130-9-2 does not transfer transmission acknowledgement packet, and transmission acknowledgement packet termination starter 130-9-3 terminates the transmission acknowledgement packet from the transmission side, causing transmission acknowledgement transmitter 130-10 to start transmitting the transmission acknowledgement packet.

Figure 27:
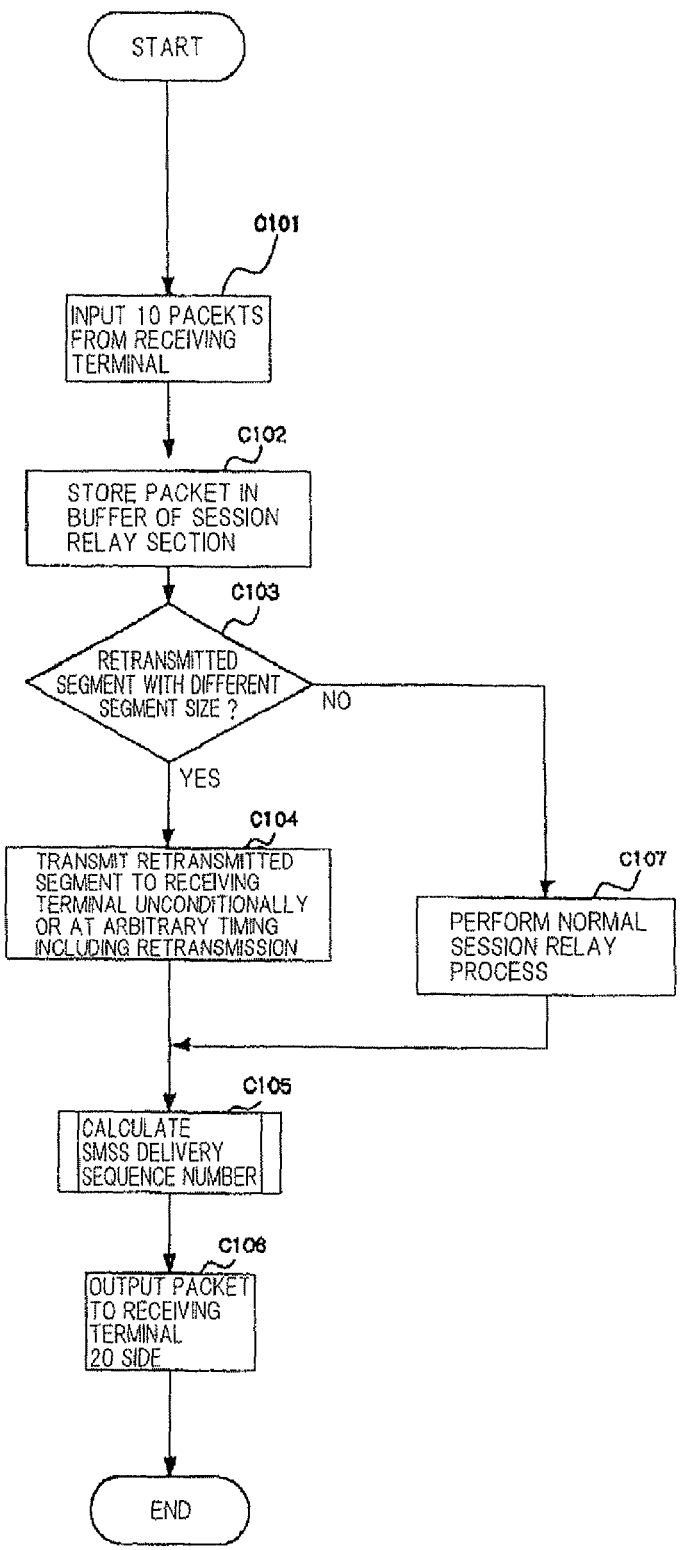
FIG. 27 is a flowchart illustrative of an operation of a session relay section shown in FIG. 22.
Figure 28:
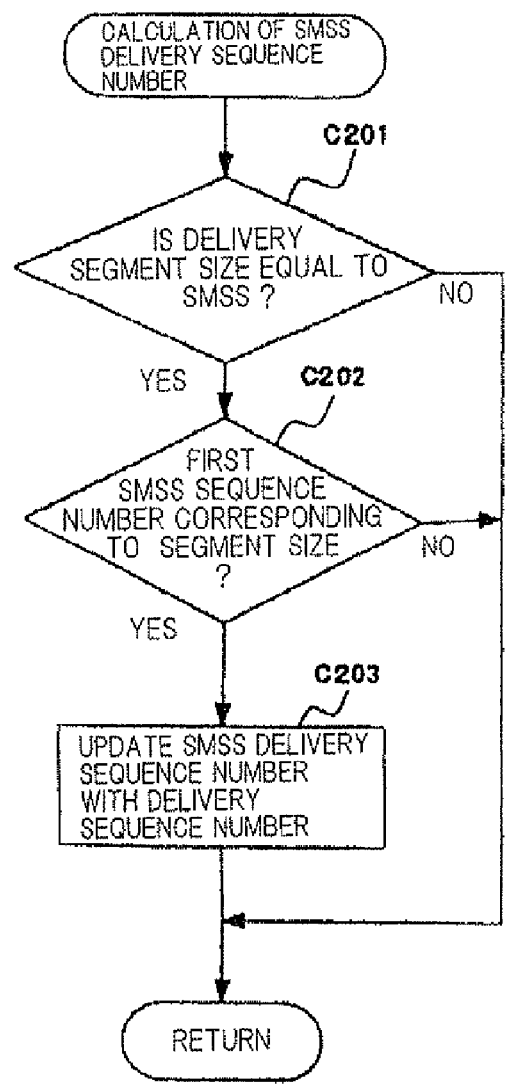
FIG. 28 is a flowchart illustrative of an operation of an MSS delivery sequence number calculator shown in FIG. 24.
Figure 29:
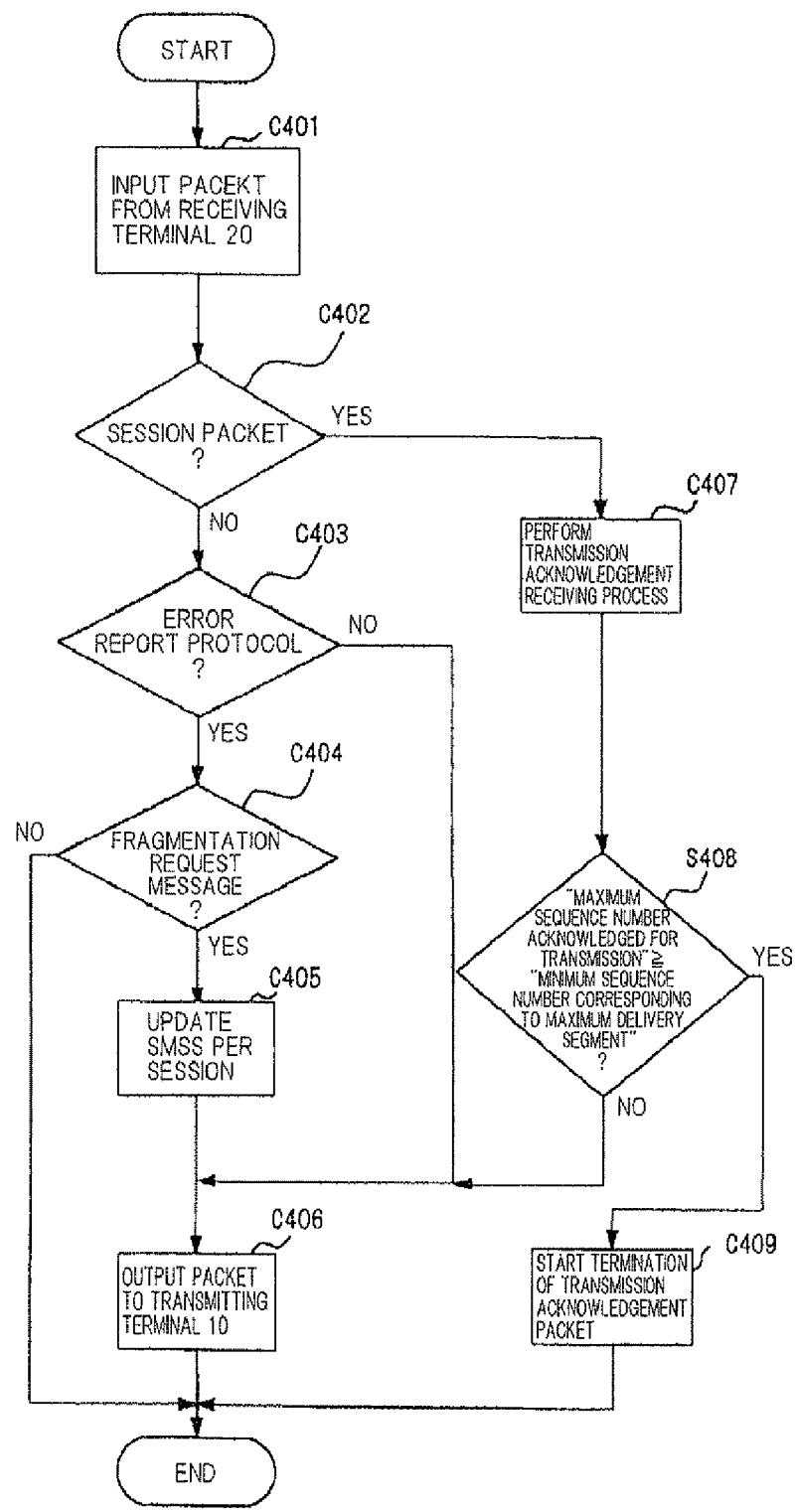
FIG. 29 is a flowchart illustrative of an operation of the transmission acknowledgement packet transfer/termination determining section shown in FIG. 22.

Specific operational details of the session relay device according to the present exemplary embodiment will be described below. FIG. 27 shows an operation of the session relay device according to the present exemplary embodiment with respect to the direction of communications from transmitting terminal 10 to receiving terminal 20, FIG. 28 shows an operation of an MSS delivery sequence number calculating process. FIG. 29 shows an operation of the session relay device according to the present exemplary embodiment with respect to the direction of communications from receiving terminal 20 to transmitting terminal 10.

First, an operation of session relay device 130 upon arrival of a data packet from transmitting terminal 10 immediately after the session opening process is finished will be described below with reference to FIG. 27.

Immediately after the session has been opened, transmission acknowledgement packet transfer section 130-9-2 transfers the transmission acknowledgement packet from transmission acknowledgement receiver 130-7 to packet output section 130-11, and transmission acknowledgement transmitter 130-10 does not deliver the transmission acknowledgement packet. At this stage, the SMSS represents a maximum segment size which was negotiated when the session was opened.

The packet delivered from transmitting terminal 10 is supplied through packet input section 130-1 to session relay section 130-3 (step C101). When the packet is input from transmitting terminal 10 to session relay section 130-3, the supplied packet is buffered and held by buffering section 130-3-1 (step C102).

After the packet from transmitting terminal 10 is buffered and held by buffering section 130-3-1, segment retransmission determining section 130-3-2 determines whether the segment held by buffering section 130-3-1 is a retransmitted segment with a different segment size or not (step C103). At this stage, since the segment held by buffering section 130-3-1 is not a retransmitted segment with a different segment size, step C103 judges "NO".

When step C103 judges "NO", normal session relay section 130-3-4 performs a normal session relay process (C107). In the normal session relay process, since the packet segment held by buffering section 130-3-1 is the first segment, the held packet segment is output to packet output section 130-4. Then, SMSS delivery sequence number calculator 130-3-5 performs an SMSS delivery sequence number calculating process on the packet output to packet output section 130-4 (step C105).

In the SMSS delivery sequence number calculating process in step C105, as shown in FIG. 28, it is first determined whether the delivery segment size is equal to the SMSS or not (step C201). Since the delivery segment size is equal to the SMSS at this stage, step C201 judges "YES". When step C201 judges "YES", it is then determined whether the sequence number is the first SMSS delivery sequence number corresponding to the segment size or not (step C202). Since the sequence number is the first SMSS delivery sequence number at this stage, step C202 judges "YES". When step C202 judges "YES", the SMSS delivery sequence number is updated with a delivery sequence number (step C203).

After the SMSS delivery sequence number calculating process in step C105 has been carried out, packet output section 130-4 outputs the packet toward receiving terminal 20 (step C106).

The segment delivered from segment relay device 130 toward receiving terminal 20 is received by relay device 40. If the size of the received segment is greater than the MTU, then relay device 40 delivers a fragmentation request message of an error report protocol toward transmitting terminal 10. The fragmentation request message of the error report protocol is received by session relay device 130.

An operation of session relay device 130 upon reception of the fragmentation request message of the error report protocol from relay device 40 will be described below with reference to FIG. 29.

The packet from the side of receiving terminal 20 is input to packet input section 130-5 (step C401). The packet input to packet input section 130-5 is supplied to session packet determining section 130-6, which determines whether the input packet is a session packet or not (step C402). Since the packet from the side of receiving terminal 20 is the fragmentation request message of the error report protocol delivered from relay device 40 toward transmitting terminal 10 at this stage, step C402 judges "NO".

When step C402 judges "NO", session packet determining section 130-6 transfers the input packet from packet input section 130-5 to error report protocol terminator 130-12, which determines whether the input packet is an error report protocol or not (step C403). Since the input packet is the fragmentation request message of the error report protocol delivered from relay device 40 toward transmitting terminal 10, step C403 judges "YES".

When step C403 judges "YES", error report protocol terminator 130-12 transfers the input packet from packet input section 130-5 to fragmentation request message transfer section 130-13, in which fragmentation request message determining section 130-13-1 determines whether the packet supplied to error report protocol terminator 130-12 is a fragmentation request message or not (step C404). Since the packet supplied to error report protocol terminator 130-12 is the fragmentation request message at this stage, step C404 judges "YES".

When step C404 judges "YES", fragmentation request message transfer section 130-13 removes the fragmentation request message of the error report protocol from error report protocol terminator 130-12, and updates the SMSS per session which is held in session status holder 130-8 based on the maximum transfer unit and the information of the header size in the removed fragmentation request message (step C405). The SMSS is updated with the value ["maximum transfer unit"–"header size"]. After the SMSS has been updated, fragmentation request message transfer section 130-13 delivers the removed fragmentation request message through packet output section 130-11 to transmitting terminal 10 (step C406).

Having received the fragmentation request message from session relay device 130, transmitting terminal 10 retransmits a packet with a reduced segment size toward receiving terminal 20 according to the received fragmentation request message.

An operation of session relay device 130 upon arrival of the packet with the reduced segment size from transmitting device 10 will be described below with reference to FIG. 27.

The packet delivered from transmitting terminal 10 is supplied from packet input section 130-1 to session relay section 130-3 (step C101). In session relay section 130-3, the packet supplied from transmitting terminal 10 is buffered and held by buffering section 130-3-1 (step C102).

After the packet from transmitting terminal 10 is buffered and held by buffering section 130-3-1, segment retransmission determining section 130-3-2 determines whether the segment held by buffering section 130-3-1 is a retransmitted segment with a different segment size or not (step C103). At this stage, since the segment held by buffering section 130-3-1 is a retransmitted segment with a different segment size, step C103 judges "YES".

When step C103 judges "YES", segment retransmitter 130-3-3 retransmits the packet segment held by buffering section 130-3-1 to packet output section 120-4 unconditionally or at an arbitrary timing including a retransmission (step C104). Then, SMSS delivery sequence number calculator 130-3-5 performs an SMSS delivery sequence number calculating process on the packet output to packet output section 130-4 (step C105).

In the SMSS delivery sequence number calculating process in step C105, as shown in FIG. 28, it is first determined whether the delivery segment size is equal to the SMSS or not (step C201). Since the delivery segment size is equal to the SMSS at this stage, step C201 judges "YES". When step C201 judges "YES", it is then determined whether the sequence number is the first SMSS delivery sequence number corresponding to the segment size or not (step C202). Since the sequence number is the first SMSS delivery sequence number at this stage, step C202 judges "YES". When step C202 judges "YES", the SMSS delivery sequence number is updated with a delivery sequence number (step C203).

After the SMSS delivery sequence number calculating process in step C107 has been carried out, packet output section 130-4 outputs the packet toward receiving terminal 20 (step C106).

Inasmuch as the size of the retransmitted segment transmitted from packet output section 130-4 is the size according to the fragmentation request message that relay device 40 has returned to the source, the retransmitted segment passes through relay device 40 and reaches receiving terminal 20. Upon reception of the retransmitted segment, receiving terminal 20 transmits a transmission acknowledgement packet which is a response packet therefor toward transmitting terminal 10. The transmission acknowledgement packet is transmitted through relay device 40 and received by session relay device 130.

An operation of session relay device 130 upon reception of the transmission acknowledgement packet from receiving terminal 20 will be described below with reference to FIG. 29.

The packet from the side of receiving terminal 20 is input to packet input section 130-5 (step C401). The packet input to packet input section 130-5 is supplied to session packet determining section 130-6, which determines whether the input packet is a session packet or not (step C402). Since the packet from the side of receiving terminal 20 is the fragmentation request message (session packet) transmitted from receiving terminal 20 toward transmitting terminal 10 at this stage, step C402 judges "YES".

When step C402 judges "YES", session packet determining section 130-6 transfers the input packet from packet input section 130-5 to transmission acknowledgement receiver 130-7, which performs a transmission acknowledgement receiving process (step C407).

Then, transmission acknowledgement packet termination determining section 130-9-1 determines whether the condition that "the maximum sequence number acknowledged for transmission"≧"the minimum sequence number corresponding to the maximum delivery segment" is satisfied or not (step C408). Since the condition is satisfied at this stage, transmission acknowledgement packet transfer section 130-9-2 indicates the start of a transmission acknowledgement process to transmission acknowledgement transmitter 130-10 (step C409). Thereafter, the transmission acknowledgement packet from the reception side is not transferred to transmitting terminal 10. As a result, the transmission acknowledgement packet from the reception side is terminated by session relay device 130, and transmission acknowledgement transmitter 130-10 starts transmitting the transmission acknowledgement packet.

With the session relay device according to the third exemplary embodiment described above, as with the first exemplary embodiment, a retransmitted segment from transmitting terminal 10 is necessarily transmitted to relay device 40. Accordingly, the session relay device can maintain stable communications between transmitting terminal 10 and receiving terminal 20 without causing communications failures.

Furthermore, since a transmission acknowledgement packet from the reception side is transferred directly to the transmitting terminal immediately after the session has been opened, the session relay device can avoid a deadlock due to an overflow of packets from the transmitting terminal.

The configurational and operational details of the first through third exemplary embodiments described above are given by way of example only, and may be changed as desired. For example, the transmission acknowledgement packet transfer/termination determining section according to the first exemplary embodiment may determine the transfer and termination of the transmission acknowledgement packet in the same manner as the transmission acknowledgement packet transfer/termination determining sections according to the second and third exemplary embodiments. Conversely, the transmission acknowledgement packet transfer/termination determining sections according to the second and third exemplary embodiments may determine the transfer and termination of the transmission acknowledgement packet in the same manner as the transmission acknowledgement packet transfer/termination determining section according to the first exemplary embodiment.

Figure 30:
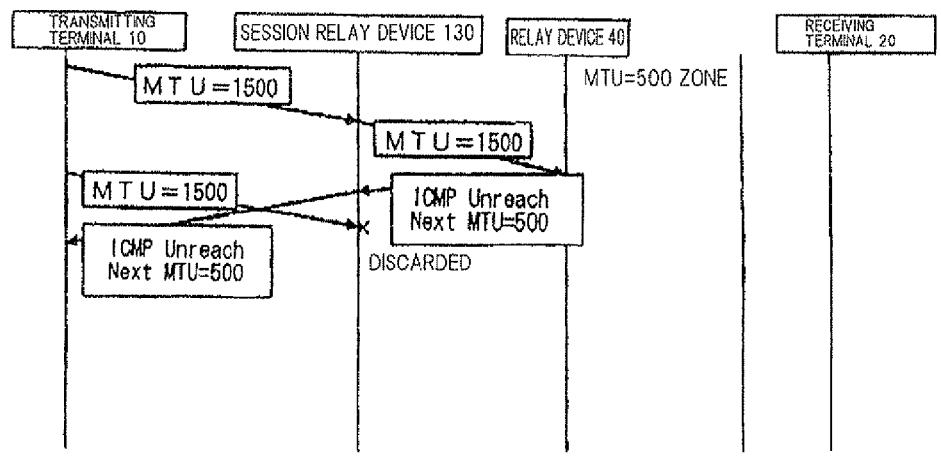
FIG. 30 is a flowchart of a process for discarding a segment.

In the second and third exemplary embodiments, the session relay section may check if the segment size is greater than the SMSS or not, and may discard the segment if the segment size is greater than the SMSS. FIG. 30 shows a process for discarding a segment, and FIG. 31 shows a process for sending a segment to a transmitting terminal without discarding it.

According to the process for discarding a segment, as shown in FIG. 30, when transmitting terminal 10 sends data having a packet size of 1500 bytes toward receiving terminal 20, the data pass through session relay device 130 to relay device 40. Since the size of the received segment is greater than the MTU (=500), relay device 40 delivers a fragmentation request message of an error report protocol (including information representing that the maximum transfer unit of a next hop is 500) toward transmitting terminal 10. The fragmentation request message of the error report protocol is received by session relay device 130. After session relay device 130 has received the fragmentation request message, if it receives data having a packet size of 1500 bytes transmitted from transmitting terminal 10 toward receiving terminal 20, then session relay device 130 discards the received data. Consequently, relay device 40 transmits a fragmentation request message of an error report protocol toward transmitting terminal 10 only once.

Figure 31:
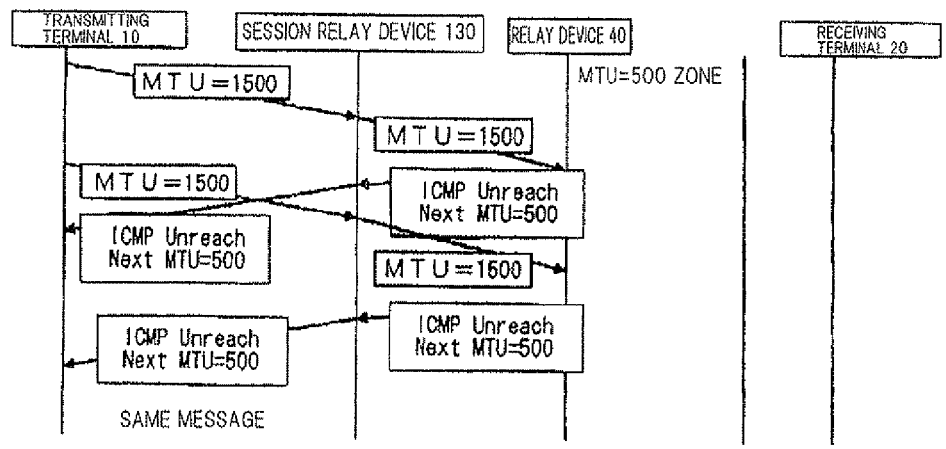
FIG. 31 is a flowchart of a process for sending a segment to a transmitting terminal without discarding it.

According to the process for sending a segment to a transmitting terminal without discarding it, as shown in FIG. 31, after session relay device 130 has received the fragmentation request message, if it receives data having a packet size of 1500 bytes transmitted from transmitting terminal 10 toward receiving terminal 20, then in order to deliver the received data to the network on the side of receiving terminal 20, a fragmentation request message of an error report protocol is transmitted a number of times from relay device 40 toward transmitting terminal 10. Therefore, fragmentation request messages are transmitted uselessly.

In the first through third exemplary embodiments, the error report protocol from the side of the receiving terminal is terminated. However, it will cause no problem to remove a fragmentation request message of an error report protocol from the side of the receiving terminal, among packets relayed in the network layer or below.

Though examples of unidirectional communications have been described in the first through third exemplary embodiments, no problem is will be caused by bidirectional communications.

In the first through third exemplary embodiments, the network configuration including one transmitting terminal, one receiving terminal, one relay device, and one session relay terminal device has been described. However, the number of the transmitting terminal, the receiving terminal, the relay device, and the session relay terminal device is not limited to one each.

The features of the present invention have been described above with respect to the session relay device, for example. However, the present invention is also applicable to other communication systems insofar as they have the features of the present invention. For example, the present invention can be carried out on TCP/IP by establishing sessions according to TCP, replacing the ICMP and fragmentation request message for reporting the error report protocol with a fragmentation request for an ICMP Destination Unreachable Message, the transmission acknowledgement packet with an ACK packet according to TCP, the transmission sequence number with a sequence number according to TCP, the header size with the sum of header sizes according to IP TCP, and the segment division inhibit flag with a Don't Fragment flag according to IP.

The present invention is also applicable to a session relay device such as a proxy or an encryption device, in addition to TCP relay devices.

The invention claimed is:

1. A session relay device adapted to be disposed between terminals for transmitting and receiving data as packets to which sequence numbers representative of an order of segments to be transmitted are assigned, for relaying data transmitted as packets between a first session opened between the session relay device and a terminal on a transmission side and a second session opened between the session relay device and a terminal on a reception side, said session relay device comprising:

a session status holder for holding information of the first and second sessions;

a segment retransmission determining section for, when a packet is received through the first session, determining whether the segment of the received packet is a retransmitted segment having a sequence number identical to, and a segment size different from, the segment of a packet already received through said first segment, by referring to session information held by said session status holder;

a segment retransmitter for, if it is determined by said segment retransmission determining section that the segment of the received packet is the retransmitted segment, transmitting said retransmitted segment through said second session;

a transmission acknowledgement receiver for receiving, through said second session, a transmission acknowledgement packet which is a response to a start packet of said first session which is relayed toward the terminal on the reception side;

a transmission acknowledgement packet transfer/termination determining section for determining whether it is to transfer or terminate the transmission acknowledgement packet received by said transmission acknowledgement receiver; and a transmission acknowledgement transmitter for generating a new transmission acknowledgement packet for said start packet and transmitting the new transmission acknowledgement packet to the terminal on the transmission side if said transmission acknowledgement packet transfer/termination determining section determines that it is to terminate the transmission acknowledgement packet;

wherein said session status holder holds, as said session status information, a transmission sequence number of said start packet and a transmission acknowledgement sequence number of a transmission acknowledgement packet received from the terminal on the transmission side; and if a maximum segment size acknowledged for transmission which is represented by the difference between said transmission sequence number and said transmission acknowledgement sequence number is smaller than a preset value given as a multiple of the maximum segment size of said second session, then said transmission acknowledgement packet transfer/termination determining section transfers said transmission acknowledgement packet through said first session toward the terminal on the transmission side, and if said difference between said sequence numbers has reached said preset value, then said transmission acknowledgement packet transfer/termination determining section terminates said transmission acknowledgement packet.

2. The session relay device according to claim 1, wherein said transmission acknowledgement packet comprises an ACK packet in accordance with TCP.

3. A session relay device adapted to be disposed between terminals for transmitting and receiving data as packets to which sequence numbers representative of an order of segments to be transmitted are assigned, for relaying data transmitted as packets between a first session opened between the session relay device and a terminal on a transmission side and a second session opened between the session relay device and a terminal on a reception side, said session relay device comprising:

a session status holder for holding information of the first and second sessions;

a segment retransmission determining section for, when a packet is received through the first session, determining whether the segment of the received packet is a retransmitted segment having a sequence number identical to, and a segment size different from, the segment of a packet already received through said first segment, by referring to session information held by said session status holder;

a segment retransmitter for, if it is determined by said segment retransmission determining section that the segment of the received packet is the retransmitted segment, transmitting said retransmitted segment through said second session;

a transmission acknowledgement receiver for receiving, through said second session, a transmission acknowledgement packet which is a response to a start packet of said first session which is relayed toward the terminal on the reception side;

a transmission acknowledgement packet transfer/termination determining section for determining whether it is to transfer or terminate the transmission acknowledgement packet received by said transmission acknowledgement receiver;

a transmission acknowledgement transmitter for generating a new transmission acknowledgement packet for said start packet and transmitting the new transmission acknowledgement packet to the terminal on the transmission side if said transmission acknowledgement packet transfer/termination determining section determines that it is to terminate the transmission acknowledgement packet; and a minimum sequence number calculator for calculating a sequence number when a delivery segment size of a packet relayed toward the terminal on the reception side has reached the maximum segment size of said second session;

wherein said session status holder holds, as said session status information, a transmission sequence number of said start packet and a transmission acknowledgement sequence number of a transmission acknowledgement packet received from the terminal on the transmission side; and if a maximum segment size acknowledged for transmission which is represented by the difference between said transmission sequence number and said transmission acknowledgement sequence number is smaller than the sequence number calculated by said minimum sequence number calculator, then said transmission acknowledgement packet transfer/termination determining section transfers said transmission acknowledgement packet through said first session toward the terminal on the transmission side, and if the maximum segment size acknowledged for transmission has reached the calculated sequence number, then said transmission acknowledgement packet transfer/termination determining section terminates said transmission acknowledgement packet.

4. The session relay device according to claim 3, wherein said transmission acknowledgement packet comprises an ACK packet in accordance with TCP.

* * * * *